US006705117B2

(12) United States Patent
Simpson et al.

(10) Patent No.: US 6,705,117 B2
(45) Date of Patent: Mar. 16, 2004

(54) METHOD OF HEATING A GLASS MELTING FURNACE USING A ROOF MOUNTED, STAGED COMBUSTION OXYGEN-FUEL BURNER

(75) Inventors: Neil George Simpson, Sylvania, OH (US); Greg Floyd Prusia, Holland, OH (US); Thomas G. Clayton, Toledo, OH (US); Andrew Peter Richardson, Clinton, NJ (US); John R. LeBlanc, Perrysburg, OH (US)

(73) Assignee: The BOC Group, Inc., Murray Hill, NJ (US)

( * ) Notice: Subject to any disclaimer, the term of this patent is extended or adjusted under 35 U.S.C. 154(b) by 48 days.

(21) Appl. No.: 09/798,826

(22) Filed: Mar. 2, 2001

(65) Prior Publication Data

US 2001/0039813 A1 Nov. 15, 2001

Related U.S. Application Data

(63) Continuation-in-part of application No. 09/374,921, filed on Aug. 16, 1999, now Pat. No. 6,422,041.

(51) Int. Cl.⁷ .................................................. C03B 5/18
(52) U.S. Cl. .................... 65/134.4; 65/134.6; 65/136.3; 65/356; 431/10; 432/10; 432/20
(58) Field of Search ................ 65/134.1, 134.4, 65/134.5, 134.6, 135.1, 135.2, 135.8, 136.1, 136.2, 136.3, 335, 347, 355, 356, 135.3; 432/20, 31, 159, 10, 182; 110/331–335; 431/8, 10

(56) References Cited

U.S. PATENT DOCUMENTS 3,337,324 A   8/1967   Cable et al.
4,170,981 A   10/1979  Hakata et al.
4,297,093 A   10/1981  Morimoto et al.
4,473,388 A   9/1984   Lauwers
4,531,960 A   7/1985   Desprez (List continued on next page.)

FOREIGN PATENT DOCUMENTS

DE   2 015 597   4/1970

(List continued on next page.)

OTHER PUBLICATIONS

Donald Prentice Satchell, et al. "U.S. Ser. No. 09/384,065.", filed (Aug. 26, 1999).
Donald Prentice Satchell, et al. "U.S. Ser. No. 09/538,021.", filed (Mar. 29, 2000).

Primary Examiner—Steven P. Griffin
Assistant Examiner—Eric Hug
(74) Attorney, Agent, or Firm—Joshua L. Cohen

(57) ABSTRACT

In an industrial glass furnace, which optionally contains recuperators, regenerators, electric boost or other devices for providing heat to glass batch material, at least one staged combustion oxy-fuel burner is mounted in the roof of the furnace to provide heat to melt the glass batch material by providing a flow of fuel to the oxy-fuel burner; providing a flow of gaseous oxidant in association with said the oxy-fuel burner; injecting the fuel and the oxidant into the furnace; and, combusting the fuel such that at least a portion of combustion is effected in the vicinity of said glass forming material to enhance convective and radiative transfer of heat to said glass forming material without substantially disturbing the glass forming material. In one embodiment, the oxy-fuel burner is adapted for injecting liquid fuels. In another embodiment, the oxy-fuel burner is adapted for fuel staged combustion and contains at least one outer oxidant injector and two inner fuel injectors, the innermost fuel injector being adapted for high velocity fuel injection and the other fuel injector, disposed between the innermost fuel injector and the outer oxidant injector, being adapted for lower velocity fuel injection.

52 Claims, 14 Drawing Sheets

U.S. PATENT DOCUMENTS

| | | | |
|---|---|---|---|
| 4,539,035 A | | 9/1985 | Burckhardt et al. |
| 4,541,796 A | * | 9/1985 | Anderson .................. 431/187 |
| 4,565,560 A | | 1/1986 | Krumwiede |
| 4,642,047 A | | 2/1987 | Gitman |
| 4,816,056 A | | 3/1989 | Tsai et al. |
| 4,878,830 A | | 11/1989 | Henderson |
| 4,909,727 A | | 3/1990 | Khinkis |
| 4,986,748 A | | 1/1991 | Brown et al. |
| 5,085,156 A | | 2/1992 | Dykema |
| 5,116,399 A | | 5/1992 | Lauwers |
| 5,139,558 A | | 8/1992 | Lauwers |
| 5,203,859 A | | 4/1993 | Khinkis et al. |
| 5,215,455 A | | 6/1993 | Dykema |
| 5,238,396 A | | 8/1993 | Yap |
| 5,256,058 A | | 10/1993 | Slavejkov et al. |
| 5,267,850 A | | 12/1993 | Kobayashi et al. |
| 5,269,679 A | | 12/1993 | Syska et al. |
| 5,299,929 A | | 4/1994 | Yap |
| 5,346,390 A | | 9/1994 | Slavejkov et al. |
| 5,346,524 A | | 9/1994 | Shamp et al. |
| 5,360,171 A | | 11/1994 | Yap |
| 5,413,477 A | | 5/1995 | Moreland |
| 5,431,559 A | | 7/1995 | Taylor |
| 5,454,712 A | | 10/1995 | Yap |
| 5,458,483 A | | 10/1995 | Taylor |
| 5,567,141 A | | 10/1996 | Joshi et al. |
| 5,611,682 A | | 3/1997 | Slavejkov et al. |
| 5,643,348 A | | 7/1997 | Shamp et al. |
| 5,683,238 A | | 11/1997 | Snyder |
| 5,755,818 A | | 5/1998 | Tuson et al. |
| 5,807,418 A | | 9/1998 | Chamberland et al. |
| 5,823,769 A | | 10/1998 | Joshi et al. |
| 5,833,447 A | | 11/1998 | Bodelin et al. |
| 5,837,028 A | | 11/1998 | Quirk et al. |
| 5,853,448 A | | 12/1998 | Duchateau et al. |
| 5,863,195 A | | 1/1999 | Feldermann |
| 5,924,858 A | | 7/1999 | Tuson et al. |
| 5,934,899 A | | 8/1999 | Joshi et al. |
| 5,984,667 A | | 11/1999 | Philippe et al. |
| 5,993,203 A | | 11/1999 | Koppang |
| 6,041,622 A | | 3/2000 | Duchateau et al. |
| 6,047,565 A | | 4/2000 | Moreau |
| 6,068,468 A | | 5/2000 | Philippe et al. |
| 6,074,197 A | | 6/2000 | Philippe |
| 6,096,106 A | | 8/2000 | Ruhl et al. |
| 6,237,369 B1 | | 5/2001 | LeBlanc et al. |
| 6,250,915 B1 | * | 6/2001 | Satchell et al. ................ 432/19 |
| 6,354,110 B1 | * | 3/2002 | Alchalabi et al. .......... 65/134.4 |
| 6,422,041 B1 | * | 7/2002 | Simpson et al. ........... 65/134.4 |
| 6,519,973 B1 | * | 2/2003 | Hoke et al. ................. 65/134.4 |

FOREIGN PATENT DOCUMENTS

| | | |
|---|---|---|
| EP | 0 754 912 A2 | 1/1997 |
| EP | 01 078 892 A2 | 2/2001 |
| EP | 00 30 6970 | 12/2002 |
| EP | 02 25 1476 | 12/2002 |
| WO | WO 99/31021 | 6/1999 |

* cited by examiner

METHOD OF HEATING A GLASS MELTING FURNACE USING A ROOF MOUNTED, STAGED COMBUSTION OXYGEN-FUEL BURNER

CROSS REFERENCE TO RELATED APPLICATIONS

The present application is a continuation-in-part of U.S. Ser. No. 09/374,921, filed Aug. 16, 1999 now U.S. Pat. No. 6,422,041.

FIELD OF THE INVENTION

The invention relates to the use of roof mounted oxy-fuel burners for glass melting. This invention further relates to the use of at least one oxygen-fuel burner that utilizes internal or external combustion staging in the roof of a glass melting furnace. The invention applies both to 100% oxygen-fuel fired furnaces and to furnaces heated by electric or non oxygen-fuel means, such as air-fuel burner(s) or their combinations.

BACKGROUND OF THE INVENTION

In one embodiment, this invention relates to the use of at least one oxygen-fuel burner in the roof of a glass melting furnace to boost production capacity or maintain current production capacity with either reduction of electro-boost or as a result of deterioration of existing heat recovery equipment such as recuperators or regenerators. The process involves the replacement of a portion of existing or previously existing air-fuel or electrical energy capacity with oxy-fuel energy. With the exception of end-fired regenerative furnaces and electric furnaces, the process involves the blocking of regenerative ports or isolation of recuperative burners. In particular the design selection, angling and positioning of the burners over the raw batch materials entering the furnace improves the rate of melting, increases product yield, provides better energy efficiency and improves glass quality. Accurate control of the stoichiometric ratio of combustion in the burner, rich-lean interaction of burners, and furnace zonal fuel/oxygen staging are used to optimise heat transfer while minimizing oxides of nitrogen and sulfur dioxide emissions.

Regenerative, recuperative, electric and direct fired furnaces have been commonly involved in the manufacture of glass and related frit products.

Air-fuel regenerative furnaces fall into two categories: cross-fired and end-fired. Cross-fired regenerative furnaces have multiple ports, typically three to eight on each side of the furnace that connect to either a common or compartmentalized regenerator to preheat the combustion air. The regenerators, which come in various shapes and sizes, reverse every 15–30 minutes dependent on furnace operation. During each reversal cycle combustion air from a fan passing through one passage in a reversal valve enters the base of the regenerator on one side of the furnace and is preheated prior to entering the ports which connect to the furnace. Fuel in the form of oil and/or gas is injected either under, over, through or side of port to produce a flame which is combusted in the glass melting furnace. The hot products of combustion exit the furnace through the opposing side port, down through the regenerator checker bricks, releasing heat and then exiting to the exhaust stack through a second passageway in the reversal valve. As the incoming combustion air-side regenerator cools, the exhaust regenerator heats until the reversal valve reverses and combustion air enters the previously hot exhaust regenerator.

The glass is melted partly due to the radiation of the air-fuel flame but mainly by re-radiation from the roof and walls which are heated by the products of combustion. To obtain higher furnace glass production capacity, many furnaces use electric boost by means of electrodes immersed in the glass. This is costly and can cause damage to the glass contact tank walls. Through time, regenerators can become blocked due to thermal/structural damage and/or carry-over of raw glass forming materials, also known as batch materials or batch, or condensation of volatile species released from the glass batch. As the regenerators start to block or fail, the preheat temperature of the air in the furnace will decrease, and the atmospheric pressure within the furnace will increase, reducing the thermal efficiency of the furnace. More fuel and combustion air would be required to maintain the same glass production rate. More importantly, because of the increase in furnace pressure, the rate of glass production must be decreased so as not to damage the refractory materials that make up the superstructure of the furnace.

To recover production capacity lost to preceding regenerator issues or to increase production in a non-encumbered furnace, oxygen has been used by four means: general air enrichment with oxygen, specific oxygen lancing under the port flames, installation of an oxy-fuel burner between first port and charging end wall, and water-cooled oxy-fuel burners installed through the port. The capacity increases from these technologies are limited by access, process requirements or refractory temperature limits.

The End-Fired Regenerative furnace is similar in operation to a cross-fired furnace; however, it has only two ports in the end wall which connect to individual regenerators. Regenerator deterioration can occur by the same mechanism as in cross-fired furnaces and similarly, electric and oxygen boost is utilized.

To recover production capacity lost to the aforementioned regenerator issues or to increase production, oxygen has been used by three means: general air enrichment with oxygen, specific oxygen lancing under the port and installation of oxy-fuel burners through the furnace. These technologies are typically capacity limited due to temperature limitations within the furnace, because of location and concerns for overheating of the furnace.

The recuperative furnace utilizes at least one recuperator type heat exchanger. Unlike the regenerator, the recuperator is continuous with a hot concurrent flow heat exchanger where exhaust gases preheat combustion air, which is ducted to individual air fuel burners along the sides of the furnace. Recuperative furnaces can also use electric boost. As with regenerative furnaces, recuperators can start to lose their efficiency and ability to preheat the air. They can become blocked or develop leaks between the walls separating the combustion air and exhaust gases.

To recover production capacity lost from the aforementioned recuperator issues or to increase production, oxygen has been used by three means: general air enrichment with oxygen, specific oxygen lancing under the air fuel burners and installation of oxy-fuel burners either through the furnace breast walls. These technologies are typically limited on capacity because of burner location limitations and concerns for overheating of the furnace.

Direct fired furnaces do not utilize preheated air and are therefore less efficient than the preceding examples of furnace design. To improve thermal efficiency or increase production capacity, side wall oxy-fuel burners have replaced air fuel burners.

Electric furnaces or furnaces which utilize electricity for the majority of melting are typically costly to operate and are subject to a shorter campaign life than the typical fossil fuel fired furnaces. Once designed, it is difficult to increase the production capacity. This invention relates to what are commonly referred to in the industry as hot top and warm top electric furnaces and does not apply to cold top furnaces.

U.S. Pat. No. 5,139,558 to Lauwers discloses the use of a water cooled, high-momentum roof-mounted auxiliary oxygen fired burner in a glass melting furnace, which is directed to the interface of the melted and solid glass forming ingredients at an angle directed upstream relative to the glass flow, whereby the solid glass forming ingredients are mechanically held back, thus being prevented from escaping the melting zone.

U.S. Pat. No. 3,337,324 to Cable discloses a process for melting batch material in a glass furnace using a burner positioned to fire substantially down over the feed end of a water-cooled furnace.

In the past, roof-mounted burners were considered in the glass industry, but were disregarded. It was perceived that the heat release from roof mounted burners was too great, resulting in the melting of the furnace crown (roof). In addition, high momentum flames from the burners would blow the batch materials around, harming the furnace walls, and generating a layer of gaseous bubbles, commonly referred to as foam, on the glass melt surface.

Recently, it has been proposed to install roof-mounted oxy-fuel burners in refractory lined glass melters. These burners are directed downwards at an angle greater than 45° with respect to the surface of the glass forming material at a controlled velocity so as not to transport loose batch material into the furnace atmosphere, and are further controlled such that a generally columnar fuel and oxygen flow combusts proximate to the top surface of the glass forming material, to produce a flame that impinges the surface of the raw glass forming material. This permits a significant increase in heat transfer into the glass, while maintaining refractory temperatures within safe operating limits, and avoiding the overheating of the roof and walls of the furnace. This technology approach, of using roof-mounted burners (non-staged) as the primary source of heat in a glass melting furnace having no regenerators or recuperators, is described in U.S. patent application Ser. No. 08/992,136 to LeBlanc, which is incorporated herein by reference as if fully written out below.

The design of an oxygen fuel burner with integral staging is disclosed in U.S. Pat. No. 5,458,483 to Taylor. Its use in a roof mounted configuration was not contemplated, however.

It is desirable to provide processes for the staging of combustion in embodiments that improve heat transfer and/or lower emissions of oxides of nitrogen, in the operation of at least one oxy-fuel burner mounted in the roof of a glass melting furnace.

SUMMARY OF THE INVENTION

The present invention relates to both 100% oxy-fuel glass furnaces and oxy-fuel boosting of air-fuel furnaces with or without the use of regenerators or recuperator heat recovery devices and/or oxygen enrichment. Consequently, the present invention relates to both the modification of existing glass furnaces and newly designed, dedicated purpose glass furnaces.

According to the present invention, glass melting furnaces of all designs can be boosted using at least one roof-mounted oxygen fuel burner(s) positioned over the raw batch materials as the materials enter the furnace to improve the rate of melting and improve glass quality and/or glass product yield. Because of the increased rate and yield of the glass melting generated by the design and positioning of these burners, depending on furnace condition and type, at least one or more of the following can be achieved: increased glass production, improved glass quality, reduction in electric boost, recovery of production lost due to inefficient heat recovery (i.e., blocked regenerators), reduction of oxygen use by replacing oxygen enrichment of the furnace atmosphere, reduction of oxygen use by replacing oxygen lancing, reduction of oxygen use by replacing conventional oxy-fuel burners positioned through the walls of a glass furnace, reduction in furnace superstructure temperature, increased furnace campaign life, improved energy efficiency, reduction in emissions of oxides of nitrogen and oxides of sulfur, reduction in fossil fuel usage, reduction in recycled glass cullet, control of exit glass temperature, and increased product glass yield.

This invention may be applied to the following types of furnaces. In hot top electric furnace applications of this invention, at least one oxygen-fuel burner will be mounted in the roof of the furnace. In cross-fired regenerative furnaces applications of this invention may sometimes necessitate at least one pair of the opposing ports to be fully or partially blocked or isolated. In end-fired regenerative furnace applications of this invention, at least one oxygen-fuel burner will be mounted in the roof of the furnace and the combustion air flow will be reduced by a portion of the original design maximum flow. In all recuperative furnace applications of this invention, at least one oxygen-fuel burner will be mounted in the roof of the furnace. In multi-burner furnaces, wall mounted burners adjacent to the roof mounted burners should be removed and the air supply isolated. In single burner or single port applications, the combustion air flow will be reduced by a portion of the original design maximum flow.

In all direct fired furnace applications of this invention, at least one oxygen-fuel burner will be mounted in the roof of the furnace. In multi-burner furnaces, wall mounted burners adjacent to the roof mounted burners should be removed and the air supply discontinued. In single burner or single port applications, the combustion air flow will be reduced by a portion of the original design maximum flow.

In all the above cases the scope of the invention is effectively the same: glass melting which was previously performed by air-fuel or oxy-fuel including but not exclusive of furnaces that utilize electric boost or conventional oxygen boosting methods, is replaced by roof-mounted oxy-fuel burners positioned over the raw batch materials entering the furnace to improve the rate of melting and/or improve glass quality and/or glass product yield. Because of the ability to position these burners at specific locations, increased heat transfer to the unmelted raw batch materials is achieved.

In all cases, at least one roof-mounted oxy-fuel burner is positioned over the raw batch materials entering the furnace to improve the rate of melting and improve glass quality, and in all multi-port and multi-burner air fuel applications at least one pair of ports or pair of burners are isolated. In all single port and single burner applications, the combustion air and fuel are reduced to a portion below the maximum design. The more efficient roof mounted burners provide energy to replace the conventional energy removed from the process and the additional energy required to achieve the desired process requirements. The positioning of the burners over the raw batch entering the furnace improves the rate of melting. The stoichiometric oxygen and fuel ratios and flow characteristics of the roof-mounted burners and remaining air-fuel burners can be controlled so as to minimize the emission of nitrous oxide and sulfur dioxide from the glass furnace.

A further embodiment of this invention relates to the use of at least one oxygen-fuel burner that utilizes internal or external combustion staging, positioned in the roof of a glass-melting furnace. This embodiment applies both to 100% oxygen-fuel fired furnaces and to furnaces heated by electric or non-oxygen-fuel (such as air-fuel burner) means. The application to oxygen-fuel fired furnaces provides an increased rate of melting, resulting in at least one of an improvement in glass quality, glass production capacity and energy efficiency (by reduction in either fossil fuel- or electro-boost) per unit output of glass. The application of the present invention to non-oxygen fuel furnaces permits one to improve glass quality, and to boost production capacity or maintain current production capacity with either reduction of electro-boost or despite the deterioration of existing heat recovery equipment. In retrofit installations, the process involves the supplement or replacement of a portion of existing or previously existing oxygen-fuel, air-fuel or electric energy capacity with oxy-fuel energy through at least one oxygen fuel burner with integral or external combustion staging located in the roof of the furnace.

In new glass furnace installations, the present invention permits the use of 100% oxy-fuel burners, including at least one roof mounted oxy-fuel burner for which combustion is integrally or externally staged. Optionally, all burners are roof mounted.

The present invention therefore provides a method of melting glass forming material in a glass melting furnace, said furnace having a back wall, breastwalls above sidewalls, and a downstream front wall connected to a roof, wherein at least one batch charger for charging glass forming batch material is contained in at least one of the back wall and the sidewall, comprising:

providing at least one oxy-fuel burner in the roof of said furnace over said batch material, wherein said at least one oxy-fuel burner is adapted for staged combustion;

providing a flow of fuel to said at least one oxy-fuel burner;

providing a flow of gaseous oxidant in association with said at least one oxy-fuel burner;

injecting the fuel and the oxidant into the furnace; and, combusting said fuel from at least said one oxy-fuel burner such that at least a portion of combustion is effected in the vicinity of said glass forming material to enhance convective and radiative transfer of heat to said glass forming material without substantially disturbing said glass forming material.

In one embodiment the invention provides a method of melting glass forming material in a glass melting furnace, said furnace having a back wall, breastwalls above sidewalls, and a downstream front wall connected to a roof, wherein at least one batch charger for charging glass forming batch material is contained in at least one of the back wall and the sidewall, comprising:

providing at least one oxy-fuel burner in the roof of said furnace over said batch material;

providing a flow of liquid fuel to said at least one oxy-fuel burner;

providing a flow of gaseous oxidant in association with said at least one oxy-fuel burner;

injecting the fuel and the gaseous oxidant into the furnace; and, combusting said fuel.

In this embodiment the one oxy-fuel burner may be adapted for staged combustion, including combusting said fuel from at least said one oxy-fuel burner such that at least a portion of combustion is effected in the vicinity of said glass forming material to enhance convective and radiative transfer of heat to said glass forming material without substantially disturbing said glass forming material.

In another embodiment, the invention provides a method of melting glass forming material in a glass melting furnace, said furnace having a back wall, breastwalls above sidewalls, and a downstream end front wall connected to a roof, wherein at least one batch charger for charging glass forming batch material is contained in at least one of the back wall and the sidewall, comprising:

providing at least one oxy-fuel burner in the roof of said furnace over said batch material, wherein said at least one oxy-fuel burner is adapted for fuel staged combustion and contains at least one outer oxidant injector and two inner fuel injectors, the innermost fuel injector being adapted for high velocity fuel injection and the other fuel injector, disposed between the innermost fuel injector and the outer oxidant injector, being adapted for lower velocity fuel injection;

providing a flow of fuel to said at least one oxy-fuel burner, wherein the flow of fuel through the innermost fuel injector has a higher momentum than the flow of fuel through the other fuel injector;

providing a flow of gaseous oxidant to the outer oxidant injector, having a lower momentum than the flow of fuel through the innermost fuel injector;

combusting said fuel from at least said one oxy-fuel burner such that at least a portion of combustion is effected in the vicinity of said glass forming material to enhance convective and radiative transfer of heat to said glass forming material without substantially disturbing said glass forming material.

In another embodiment, the present invention provides an oxy-fuel burner comprising at least one outer oxidant injector and two inner fuel injectors, the innermost fuel injector being adapted for high velocity fuel injection and the other fuel injector being adapted for lower velocity fuel injection.

In a further embodiment, the present invention provides a method of melting batch material in a glass furnace having regenerators, recuperators and/or electric boost, said furnace having sidewalls, a back wall, a front wall and a roof comprising:

providing at least one burner in the roof of said furnace over said batch material;

providing a flow of gaseous oxidant to said at least one burner;

providing a flow of gaseous fuel to said at least one burner;

generating a flame from at least said one burner said flame having a velocity sufficient to maximize transfer of heat from said flame to said batch material without substantially disturbing said batch material, and, providing additional oxygen to complete combustion at or near the surface of said batch material from at least one oxygen injector in the roof of said furnace.

BRIEF DESCRIPTION OF THE DRAWINGS

Further features and other objects and advantages of this invention will become clear from the following detailed description made with reference to the drawings in which.

DETAILED DESCRIPTION OF THE INVENTION

Figure 1:
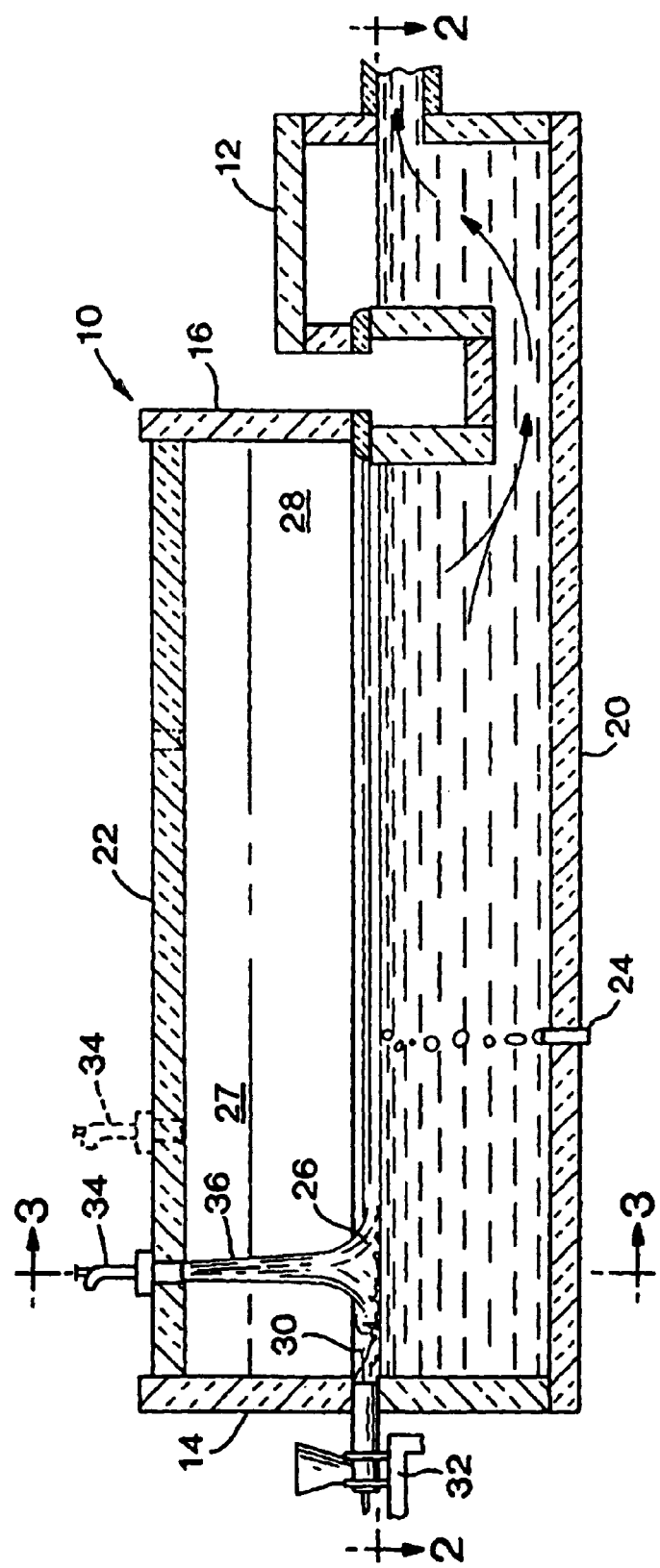
FIG. 1 is a cross sectional longitudinal view of a glass melting furnace in accordance with the present invention.

In the glass furnaces for which the present invention is intended, a typical burner discharges a mixture of fuel and either air or oxygen in a particular ratio of fuel to oxidant, to produce a combustible mixture. Once ignited, this combustible mixture burns to produce a flame that is used to heat and melt the glass batch materials. The process of the present invention differs from that utilized in conventional fossil fuel fired air fuel and oxy-fuel furnaces, where heat transfer is effected principally by radiation directly from the walls and roof of the furnace and direct radiation from the flames. The process utilizing at least one roof mounted oxy-fuel burner(s), in addition to a radiation heat transfer component, provides significant convective heat transfer due to the impingement and final reaction of reactive intermediate species such as carbon monoxide, hydrogen, and hydroxyl radicals, to stable combustion products such as carbon dioxide and water vapor at the glass batch surface. This type of heat transfer is enhanced when the oxy-fuel burner is either integrally (within the burner block) or externally staged, so as to delay a portion of the combustion, thereby lowering flame temperature and radiant heat losses until the glass surface is reached. As a result, heat transfer to the furnace superstructure is reduced.

Suitable fuels for combustion include, but are not limited to, methane, natural gas, liquefied natural gas, propane, liquefied propane gas, butane, low BTU gases such as town gas, producer gas or the like, vaporized or atomized oil, kerosene or diesel, or mixtures thereof, at either ambient temperature or in preheated form. Preferred oxidants include oxygen-enriched air, containing greater than 20.9 volume percent oxygen to about 80 volume percent, preferably greater than 50 volume percent, such as produced by filtration, absorption, membrane separation, or the like; non-pure oxygen such as that produced by, for example, a vacuum swing adsorption process and containing about 80 volume percent to about 95 volume percent oxygen; and "industrially" pure oxygen containing about 90 volume percent to about 100 volume percent oxygen, such as is produced by a cryogenic air separation plant. The oxidant may be introduced at either ambient temperature or in preheated form. The fuel and the oxidant are generally introduced in the furnace through a burner assembly.

The burner assembly generally includes a burner block formed to include a flame chamber having inlet and outlet openings, burner means for discharging fuel into a flame chamber formed in the burner block and means for discharging oxygen into the flame chamber. In operation, discharged oxygen mixes with fuel provided by the discharging burner means inside the flame chamber. This combustible fuel and oxygen mixture can be ignited to define a flame having a root portion in the flame chamber and a tip portion outside the flame chamber. If the burner assembly to be used comprises an "internally staged" burner for secondary combustion purposes, the burner block may further include bypass means for conducting oxygen outside of the flame chamber, such as to oxygen-discharge ports around the outlet opening of the flame chamber. In operation, oxygen may pass through the bypass means formed in the burner block to the oxygen-discharge ports, and be ejected from the burner block into a downstream "second-stage" region containing a portion of the flame and lying outside the flame chamber in the furnace, to heat the glass batch materials or melt.

In certain preferred embodiments, the integrally staged burner block is made of a refractory material and includes an outside wall formed to include the flame chamber inlet opening and a plurality of oxygen-admission ports around the inlet opening. The burner block also includes a furnace wall configured to lie in a furnace and formed to include the flame chamber outlet opening and the plurality of oxygen-discharge ports around the outlet opening. In alternative embodiments, one or more oxidant entry means can be provided externally to the burner block, as described below, to enable staged combustion to be effected in the furnace.

Suitable materials for the refractory burner block include but are not limited to silica, mullite, zirconia ($ZrO_2$), fused cast alumina-zirconia-silica (AZS), rebonded AZS, or bonded alumina ($Al_2O_3$). The particular material chosen is determined, in part, by the type of glass to be melted in the glass furnace.

Staged combustion has been proposed for glass furnace burners, such as those in which a fuel rich oxy-fuel mixture is injected into the furnace from a burner, and additional oxygen is injected by means external to the burner block in order to provide complete combustion displaced from the burner exit. In the instance of roof-mounted burners, preferably complete combustion would occur in the proximity of the surface of the raw batch materials. Preferably, additional oxygen injectors would be positioned to delay complete combustion until after the flame has impinged on the surface of the raw batch. The location of the additional injectors is dependant upon the desired operating conditions of the burner(s), as well as burner location and number. According to the present invention, externally staged combustion is preferably provided by installing at least one oxygen injector means in the roof or crown of the furnace, although oxygen injectors may be positioned elsewhere in order to obtain the desired delayed combustion effects.

According to the present invention, the at least one oxy-fuel burner(s) are preferably positioned in the roof (or crown) of the furnace above the raw batch (and optionally, cullet) materials, and directed to the batch surface. The burners may be positioned as close as possible to the batch chargers where the coolest batch materials are, proximate to the furnace back wall where the glass forming material is charged, to obtain rapid melting due to the higher thermal difference. Conventional air fuel or oxygen fuel burners may be positioned through the walls of the furnace downstream from the roof-mounted burners to provide a refining zone and insure complete combustion of reactants. Alternatively, oxy-fuel roof mounted burners may provide heat transfer downstream of the batch chargers proximate to the furnace downstream end wall, that is, the front wall of the furnace.

The roof mounted oxy-fuel burner is successful according to the present invention, because a portion of the combustion occurs on the batch surface of the glass melter, which adds convective heat transfer to the traditional radiative heat transfer. Further in accordance with the preferred embodiment of this invention, use of roof mounted oxy-fuel burners provided with integrally or externally staged combustion, delays mixing the oxygen and fuel to project the combustion zone farther away from the roof. This results in localizing more of the combustion on or at the surface of the glass raw batch or melt materials to increase the convective heat and radiative heat transfer. The high temperature flame is moved away from the roof to avoid damaging the structure, and nearer to the glass to promote heat transfer. One additional advantage is that the inventive roof mounted staged combustion embodiment allows the process to operate in furnace constructions that have higher roofs. The delay is created by separating the two gas flows (either oxygen only/fuel only, or a fuel-lean/fuel-rich mix) by a sufficient amount, and in one embodiment, angling them toward each other to have their flow center lines converge on the batch or melt surface.

Oxygen/natural gas burners operate at a stoichiometric ratio of 2:1 when the natural gas is pure methane and the oxidant is pure oxygen. The conventional conical flame oxygen/gas burner uses a concentric tube in tube construction with the inner tube supplying the gas and the outer tube supplying the oxygen. The flame length then becomes a function of the velocity of the two flows and the relative velocity differences between the two flows, which will affect the mixing rate at the interface between the two streams and therefore the rate of combustion. Because both streams will expand as they exit the tubes, they will begin to mix immediately and combustion will start very close to the burner discharge point.

The present invention separates the two flows (fuel and oxidant) into two or more separate streams. In one embodiment, a fuel gas stream can be operated as a gaseous fuel only or as a concentric tube burner with a less than the stoichiometric ratio of oxygen. The remaining oxygen required for complete combustion, optionally up to 100% of the required oxygen, is introduced through one or more additional tubes that are located away from the gas tube far enough that the two streams do not mix until they have traveled a substantial distance to the target, glass materials surface. The angle that separates the two streams can be as low as 0° (parallel), or as high as 90° if projected through the walls of the furnace, and up to 180° if bubbled from beneath the surface of the melt, as long as the mixing occurs beyond the burner discharge point.

As stated above, one advantage of the process of the present invention is the ability to operate the roof mounted burner farther away from the target, i.e. have a greater distance from the roof to the glass material surface. This allows the roof mounted oxy-fuel burner(s) to operate in existing furnace designs, where the roof is currently too far from the batch for a non-staged roof mounted burner to achieve any significant rate of convective transfer.

Referring to the figures, there is shown a glass melting furnace 10 for providing molten glass to a glass forehearth or refiner 12 wherein the molten glass is further refined and subsequently fed to one or more glass-forming machines such as containers, fiberizers, float baths and the like (not shown). In considering the figures, it will be appreciated that for purposes of clarity certain details of construction are not provided in view of such details being conventional and well known by someone skilled in the art once the invention is disclosed and explained. Specific items excluded are the regenerator ports, air-fuel burners and exhausts since these are different for each type of furnace.

The glass melting furnace 10 typically includes an elongated channel having an upstream end wall 14 and a downstream end wall 16, side walls 18 a floor 20 and a roof 22 all made from appropriate refractory materials such as alumina, silica, alumina-silica, zircon, zirconia-alumina-silica, chrome oxide and the like. The roof 22 is shown generally as having an arcuate shape transverse to the longitudinal axis of the channel, however, the roof may be of most any suitable design. The roof 22 of the typical glass melting furnace 10 is positioned between about 3–15 feet above the surface of the raw glass-forming material. As well known in the art, the glass melting furnace 10 may optionally include one or more bubblers 24 and/or pairs of electrical boost electrodes (not shown). The bubblers and/or electrical boost electrodes increase the temperature of the bulk glass and increase the molten glass circulation under the batch cover.

The glass melting furnace 10 includes two successive zones, a melting zone 27 and a downstream fining zone 28. The melting zone 27 is considered the upstream zone of the glass melting furnace 10 wherein raw glass-forming material is charged into the furnace using a charging device 32 of a type well known in the art. The raw glass-forming material 30 may be a mixture of raw materials typically used in the manufacture of glass. It will be appreciated that the composition of the raw glass-forming material (or batch) 30 is dependent on the type of glass being produced. Normally, the material comprises, inter alia, silica containing materials including scrap glass commonly referred to as cullet. Other glass-forming materials including but not limited to feldspar, nepheline syenite, limestone, dolomite, soda ash, potash, borax, kaolin clay and alumina may also be used. To alter the properties of the glass, a minor amount of arsenic, antimony, sulfates, sulfides, carbon, fluorides and/or other components may also be added. Moreover, oxides of barium, strontium, zirconium and lead may be added for special purpose glass, and other color forming metal oxides may be added to obtain the desired color.

The raw glass-forming material 30 forms a batch layer of solid particles on the surface of the molten glass in the melting zone 27 of the glass melting furnace 10. The floating solid batch particles of raw glass-forming material 30 are melted principally by at least one oxygen-fuel burner 34 having a controlled impinging flame shape and length mounted within the roof 22 of the glass melting furnace 10. It will be appreciated that it has been found that the installation and proper control of at least one oxygen-fuel burner 34 in the roof 22 of the glass melting furnace 10 over the raw glass-forming material 30 in accordance with the present invention increases the melting rate of the solid raw glass-forming material and, at the same time, maintains the operating temperature of the surrounding refractory material within acceptable operating limits.

Figure 2A:
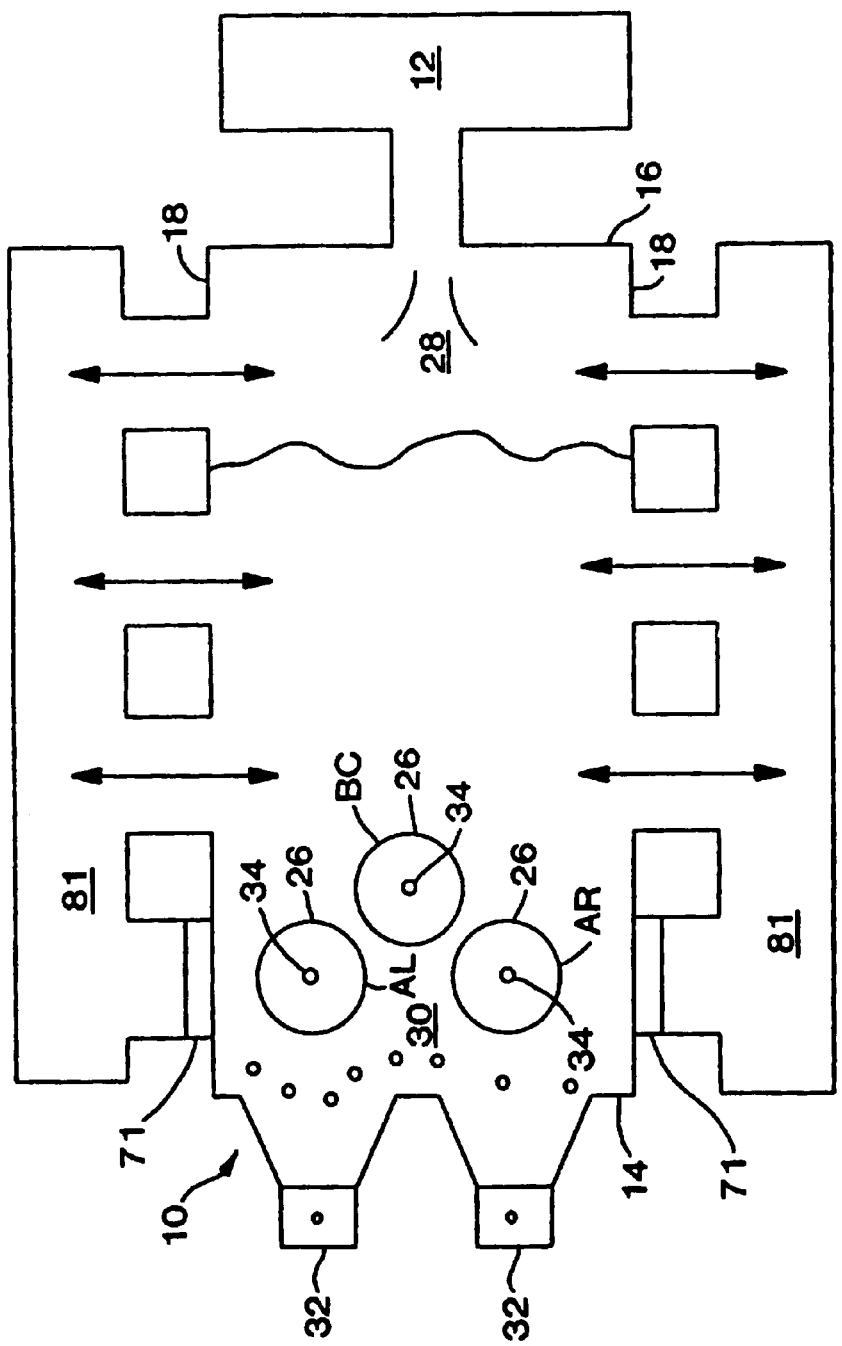
FIG. 2A is a cross-sectional plan view of a cross-fired regenerative embodiment of the glass melting furnace of FIG. 1 along line 2—2.
Figure 3:
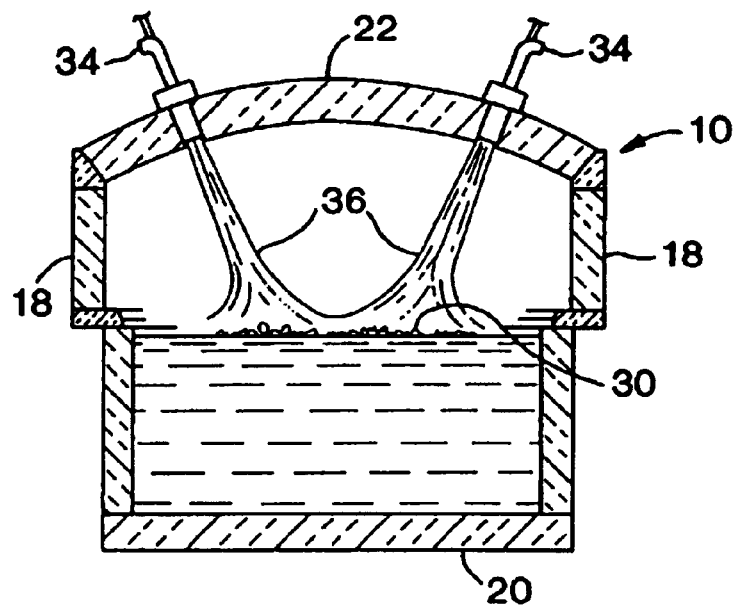
FIG. 3 is a cross sectional view of the glass melting furnace of FIG. 1 along line 3—3 illustrating two oxygen-fuel burners adjacent the upstream end wall of the furnace.
Figure 4:
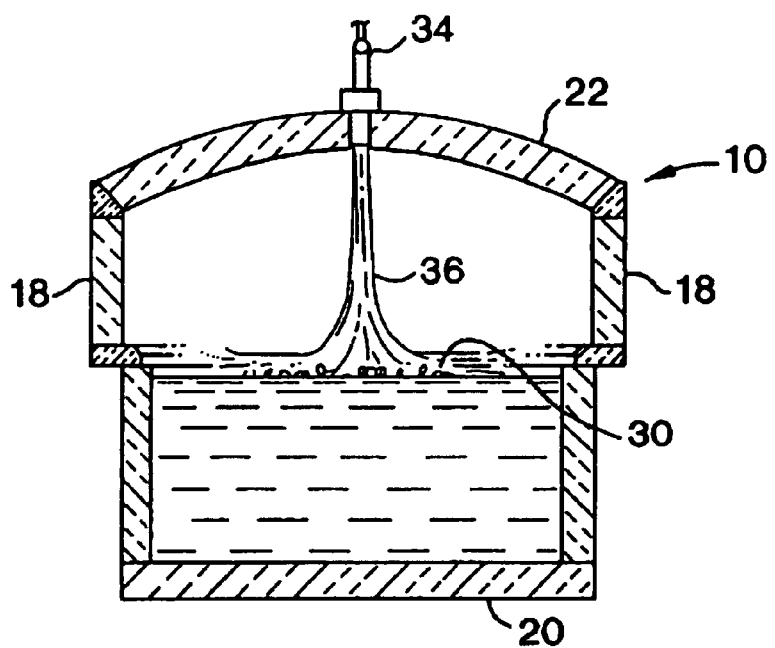
FIG. 4 is an alternate cross sectional view of the glass melting furnace of FIG. 1 along line 3—3 illustrating one oxygen-fuel burner adjacent the upstream end wall of the furnace.

As used herein, the phrase "at least one oxygen-fuel burner" means one or more oxygen fuel burners. Also as used herein, by 100% oxy-fuel is meant that all burners are adapted to utilize oxygen or oxygen enriched air, as contrasted to air alone, as the oxidant. Furthermore, as used herein the phrase "principally by at least one oxygen-fuel burner" refers in retrofit installations, to the condition wherein the additional or recovered glass production capacity and replaced air fuel and or electric/oxygen boost energy for melting of the raw glass-forming material is from at least one oxygen-fuel burner. In one particular embodiment, as shown in FIGS. 1 and 2A the glass melting furnace 10 includes three oxygen-fuel burners 34. A single oxygen-fuel burner 34 is positioned upstream of two adjacently positioned downstream oxygen fuel burners. However, it will be appreciated that any number of oxygen-fuel burners 34 may be positioned at almost any suitable location in the roof 22 of the furnace 10 over the batch to melt the raw glass-forming material 30. For example, two oxygen-fuel burners 34 may be positioned in a side-by-side relation as depicted in FIG. 3 or a single oxygen-fuel burner may be used as depicted in FIG. 4. Nonetheless, in accordance with the present invention, the angular orientation of each oxygen-fuel burner 34 in the roof 22 of the glass melting furnace may be such that the flame 36 produced is directed substantially perpendicular to the glass batch surface to produce a flame which impinges on the glass surface to form an impingement area 26. In a preferred embodiment, the oxygen-fuel burners 34 are positioned substantially perpendicular to the batch material at an angle of about 90 degrees relative to the raw glass-forming material 30. The angle may deviate from the perpendicular in the direction of the downstream end-wall (i.e., the front wall) in some embodiments by as much as 45 degrees, but preferably less than 10 degrees. It has been found that the glass production rate and the quality of glass produced may be improved by melting the raw glass-forming material 30 with at least one downwardly firing oxygen-fuel burner 34 having a controlled impinging flame shape and length in accordance with the present invention.

The at least one oxygen-fuel burner requires fuel and an oxidant. The fuel can be either gaseous or liquid or combinations of both. Gaseous fuels include those listed above, as well as blends of the aforementioned gases. Liquid fuels include heavy, medium and light fuel oils, kerosene and diesel. Liquid fuels are required to be atomized and/or vaporized. The atomization can be either by mechanical means or secondary atomizing mediums which include air, steam, oxygen, any of the aforementioned gaseous fuels and in some cases an inert gas. Vaporization relies on the heat of the surrounding products of combustion gases to evaporate the oil. The oxidant can be either 100% pure oxygen or a blend of oxygen and inert gas with an oxygen concentration of preferably 50–100%, as described above.

Figure 5:
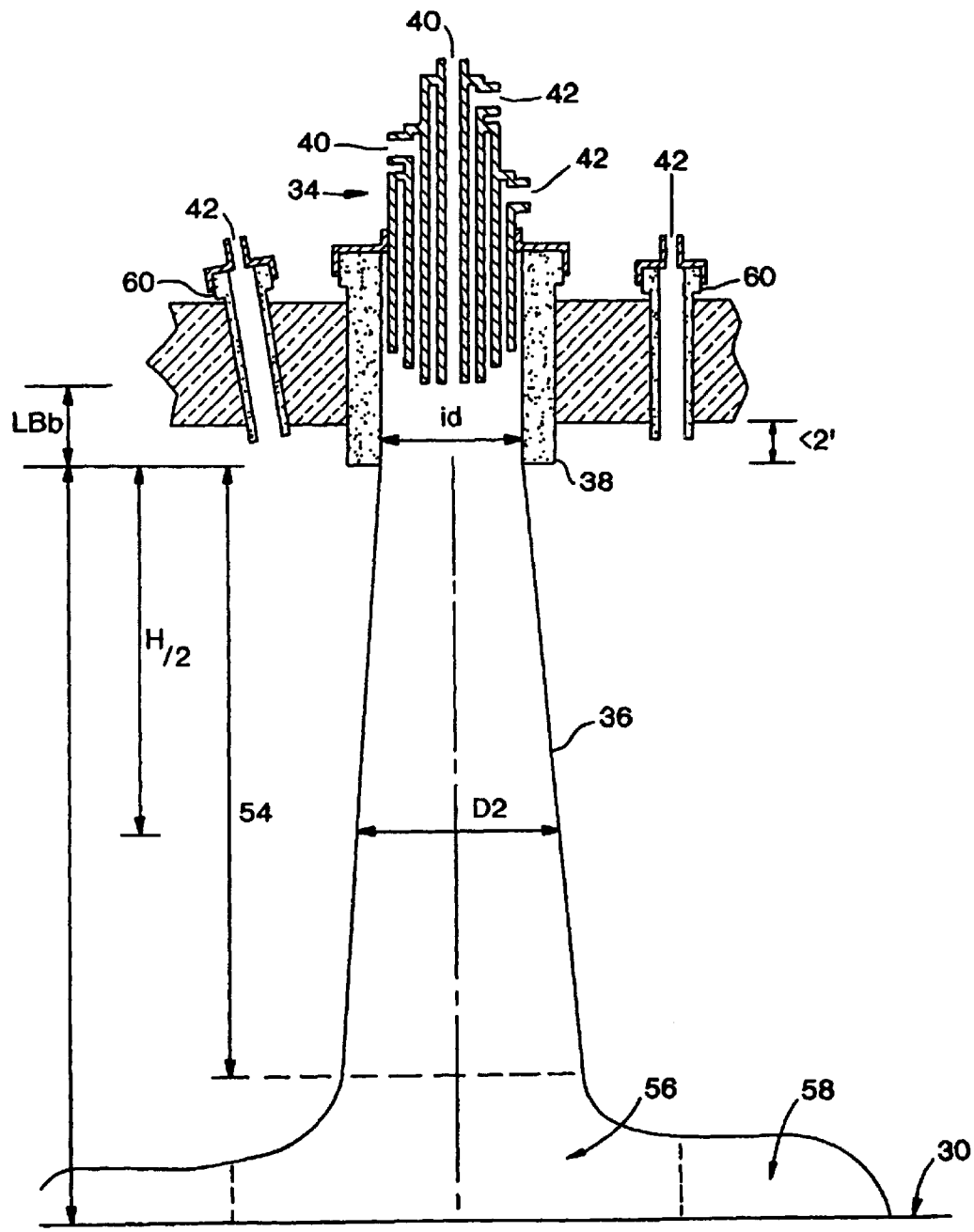
FIG. 5 is a cross sectional view of an oxygen fuel burner and a schematic representation of a burner flame from the oxygen burner.

Referring to FIG. 5, the at least one oxygen-fuel burner 34 within the roof 22 of the glass melting furnace 10 has at least one fuel conduit 40 for providing fuel and at least one oxygen conduit 42 for providing oxygen flow. The oxygen-fuel burner 34 may have a capacity ranging from about 0.5 to about 15 MM Btu/hr depending upon the glass melting furnace 10 size and desired pull rate. The oxygen-fuel burner 34 is designed to use a higher percentage of oxygen than is present in air and thus the temperature above the area of impingement of the flame 36 from the oxygen-fuel burner 34 is substantially higher than in a conventional glass melting furnace utilizing air-fuel burners. Notwithstanding, as well known to one skilled in the art, the temperature of the flame 36 imparted by an oxygen-fuel burner 34 is dependent on the quality of the fuel and the oxygen/fuel ratio. In a preferred embodiment, the oxygen concentration of the oxygen-fuel burner 34 is typically at a level of about 95–125 percent of the stoichiometric amount of oxygen required to combust the fuel. The fuel to oxygen ratio can be varied, however, to produce a range of operating conditions in the glass melting furnace 10 to effect one or more desired properties, including, for example, redox level, glass color, the level of gaseous bubbles known as seeds and blisters in the trade and other glass properties.

The oxygen-fuel burner 34 extends downwardly from a burner block 38 located in the roof 22 of the glass melting furnace 10. Each primary burner block 38 includes an opening having an inside diameter (id) which is at least as great as the external diameter of the largest conduit 42 or 40 dependent on configuration. The inside diameter (id) of the opening of the burner block 38 may range between about 2–8 inches. The end of the oxygen-fuel burner 34 primary combustion zone is located from the end of the burner block 38 a distance (LBb) between about 0–18 inches. The secondary and in some cases tertiary combustion zone is external to the burner block 38. It will be appreciated that the opening of the burner block 38 between the end of the oxygen-fuel burner 34 and the end of the burner block in some instances acts to focus the burner flame and prevent the burner flame from spreading outwardly but moreover protects the conduits of the burner. The burner block 38 is made of a refractory material as well known in the art and may be of most any suitable outside shape such as rectangular and the like.

The bottom surface of the burner block 38 may be flush with the inside surface of the roof 22 or the bottom surface may project below the inside surface of the roof to a distance of about 2 inches to protect the burner block 38 and adjacent crown refractories from wear. Furthermore, as shown in FIG. 5, the fuel conduits 40 and oxygen conduits 42 of the oxygen-fuel burner 34 extend downwards within the burner block 38 and terminate at either substantially the same vertical height or totally different vertical heights from the exit of burner block 38.

Dependent on height of burner block 38 from raw batch and desired operating conditions of the burner, the greater the fraction of fuel staging and oxygen staging internal and external to the burner block 38 will vary. Additional oxygen injectors 60 are positioned to delay complete combustion until after the flame has impinged on the raw batch. The location of these additional injectors 60 is dependent on number and position of roof mounted burners, however they can be located in practically any point in the roof and walls.

In accordance with the present invention, the downwardly directed impinging flame 36 produced by the at least one oxygen-fuel burner 34 is precisely controlled to give a flame length greater than or equal to the distance from the exit of burner block 38 to the surface of the raw glass-forming ingredients 30 or the surface of the molten glass, and away from the surrounding refractory, thereby reducing the risk of overheating the roof 22 and side walls 18 of the glass melting furnace 10. The impinging flame 36 may be controlled by such control devices as are conventional and standard in chemical processing. For example, valves, thermocouples, thermistors coupled with suitable servo circuits, heater controllers and the like are readily available and conventionally used for controlling the quantity and velocity of the fuel and oxygen from the oxygen-fuel burner 34.

The impinging flame 36 is precisely controlled by controlling both the relative velocity and the maximum and minimum velocities of the fuel and of the oxygen streams and the internal and external staging from the at least one oxygen-fuel burner 34.

The maximum and minimum velocity of the fuel and oxygen flow impinging on the surface of the raw glass-forming material 30 must be controlled to prevent the disturbance of the batch material and entrainment of or the displacement of glass batch material against the side walls 18 and roof 22 of the furnace while maintaining optimum convective heat transfer to the surface of the raw glass-forming material. It will be appreciated that the displacement of glass batch material against the side walls 18 and roof 22 will adversely effect the refractory material and possibly shorten the operating life of the glass melting furnace 10.

In order to determine the proper maximum velocity for the fuel and oxygen flow a burner was vertically mounted and fired downwards into a bed of glass sand across which grooves had been made. While the burner was adjusted to different heights from the sand and burner retractions into the block (LBb) the firing rates at which sand movement was discerned was noted. The data from these experiments was compared against simulations run on a commercially available computational fluid dynamics code thus yielding a maximum velocity across the surface above which sand would be disturbed in the aforementioned experiments.

TABLE 1

Maximum Burner Firing Rates (MMBtu/Hour)

| (LBb) | Height (feet) | | | |
| --- | --- | --- | --- | --- |
|  | 5 ft | 6 ft | 7 ft | 8 ft |
| 13 | 3.9 | 4.4 | 5.4 | 6.2 |
| 11.5 | 4.9 | 5.0 | 6.2 | 6.8 |
| 9 | 5.5 | 6.1 | 6.4 | 7.1 |
| 6.5 | 6.4 | 7.2 | 7.4 | 8.1 |
| 4 | 6.9 | 8.8 | 8.3 | 9.1 |

From these experiments the maximum surface velocity was ascertained by comparison with the CFD models to be approximately 21 m/s. Due to variations in batch material, batch glazing and batch particle cohesion the exact maximum may differ from the above calculated maximum, therefore, it should be possible for one skilled in the art to vary the maximum velocity up to approximately 25 m/sec. To minimize disturbance and entrainment of the batch material, however, the maximum velocity should be kept below 30 m/sec.

The maximum and minimum velocities of the fuel and of the oxygen of the oxygen-fuel burner 34 are also controlled to harness the maximum energy from the impinging flame 36 without damaging the surrounding refractory material. The maximum energy from the impinging flame 36 is achieved by minimizing the amount of heat released to the glass melting furnace 10 combustion space and maximizing the heat transfer to the raw-glass forming material 30. The operational maximum and minimum velocity range for the oxygen-fuel burner 34 to generate an acceptable heat transfer rate to the raw glass-forming material 30 without damaging the refractory material furnace walls and superstructure is a function of the design and location of the oxygen-fuel burner, burner block opening geometry, the velocities of the fuel and oxygen from the oxygen-fuel burner 34, burner staging, interaction of adjacent oxygen-fuel burners, fuel burners and furnace exhaust.

The stagnation region 56, is the region where the flame 36 penetrates the thermal boundary layer and impinges upon the surface of the raw glass-forming material 30. Within this region 56, the flame 36 penetrates the thermal boundary layer and impinges on the surface of the raw glass-forming material building a sharp pressure gradient at the surface that accelerates the horizontal flow of the deflected flame causing the flame to spread outwardly radially along the impinged surface. The end of the stagnation region 56 is defined as the location on the surface of the raw glass-forming material where the pressure gradient generated by the impinging flame 36 drops to zero. Within the stagnation region 56, by carefully controlling the momentum of flame 36, the thermal boundary layer that naturally exists at the surface of the raw glass-forming material 30 is penetrated and eliminated and thus its strong heat resistive features are attenuated. Accordingly, the heat generated by the impinging flame 36 penetrates more easily into the partially melted raw glass-forming material 30. Furthermore, within the stagnation region 56 the flame 36 luminosity significantly increases which enhances the radiation heat transfer into the relatively colder raw glass-forming material 30.

At the radial limits of the stagnation region 56 the wall jet region 58 begins. In this region, the flame 36 flows essentially parallel to the impinged surface and the thermal boundary layer grows along the impingement surface and outward from the stagnation region 56, thus the thermal boundary layer starts to build up restoring the surface resistance to the heat flow into the raw glass-forming material surface.

The controlled flame heat generation in the free-jet region 54 is the result of the design of the oxygen-fuel burner 34, inside diameter of the opening (id) of the burner block 38 and both the relative velocities and maximum and minimum velocities of the oxygen and fuel streams. By selectively controlling the design of the oxygen-fuel burner 34, the burner block 38 geometrical design and the velocities of the oxygen and fuel streams a reduced shear stress between the oxygen and gas streams is produced providing controlled partial combustion and reduced thermal radiation emissions. It will be appreciated that by optimizing burner design and operation of the oxygen-fuel burner 34, the flame heat generated in the free jet region 54 and the heat transfer resistance at the raw glass surface in the stagnation region 56 are minimized thereby maximizing the heat generated in the stagnation region.

The heat generated in the free-jet region 54 is the result of the following processes. First, the controlled partial combustion in the free-jet region 54 permits controlled combustion at the surface of the raw glass-forming material 30 thereby bringing the combustion process proximate to the surface of the raw glass-forming material. Bringing the combustion process proximate the surface of the raw glass-forming material 30 generates an elevated temperature gradient at the surface of the raw glass-forming material thereby improving the convection heat transfer. Second, the controlled partial combustion in the free-jet region 54 generates an acceptable temperature for the chemical dissociation of the combustion gases and the products of combustion. These dissociated species, once impinged on the relatively colder surface of the raw glass-forming material 30, partially recombine, exothermically, generating significant heat at the surface of the raw glass-forming material. The heat from the exothermic reactions further augments the convective heat transfer process. The minimization of the heat resistance at the stagnation region 56 of the surface of the raw glass-forming material 30 is the result of the following factors.

First, the thermal boundary layer is eliminated through the controlled flame 36 momentum and the turbulence generated by the carefully controlled combustion characteristics at the surface of the raw glass-forming material 30. Second, the localized surface heat generation allows for the conversion of the low thermal conductive raw glass-forming material 30 into a significantly better conductive molten glass material. This conversion allows for the heat generated at the surface to penetrate more efficiently into the raw glass-forming material depth.

In the cross-fired regenerative furnace FIG. 2A with regenerators 81 the preferred embodiment of the present invention utilizes at least one crown mounted burner 34 positioned over the raw batch materials entering the furnace to improve the rate of melting and improvement in quality to recover or boost production capacity or reduce electric boost capacity. Crown-mounted burner 34 impinges the surface of the batch material 30 in impingement area 26. In all cross-fired regenerative furnace applications of this invention at least one pair of the opposing ports 71 will be fully or partially blocked or isolated. This will typically be the first port and perhaps the second port dependent on the amount of boost required. Additional roof-mounted burners can be located down the glass tank provided there are crown mounted burners positioned over the unmelted batch materials. The energy delivered from the crown mounted burners replaces energy removed from the previously firing ports, the removed conventional electric or oxy-boost.

Figure 2B:
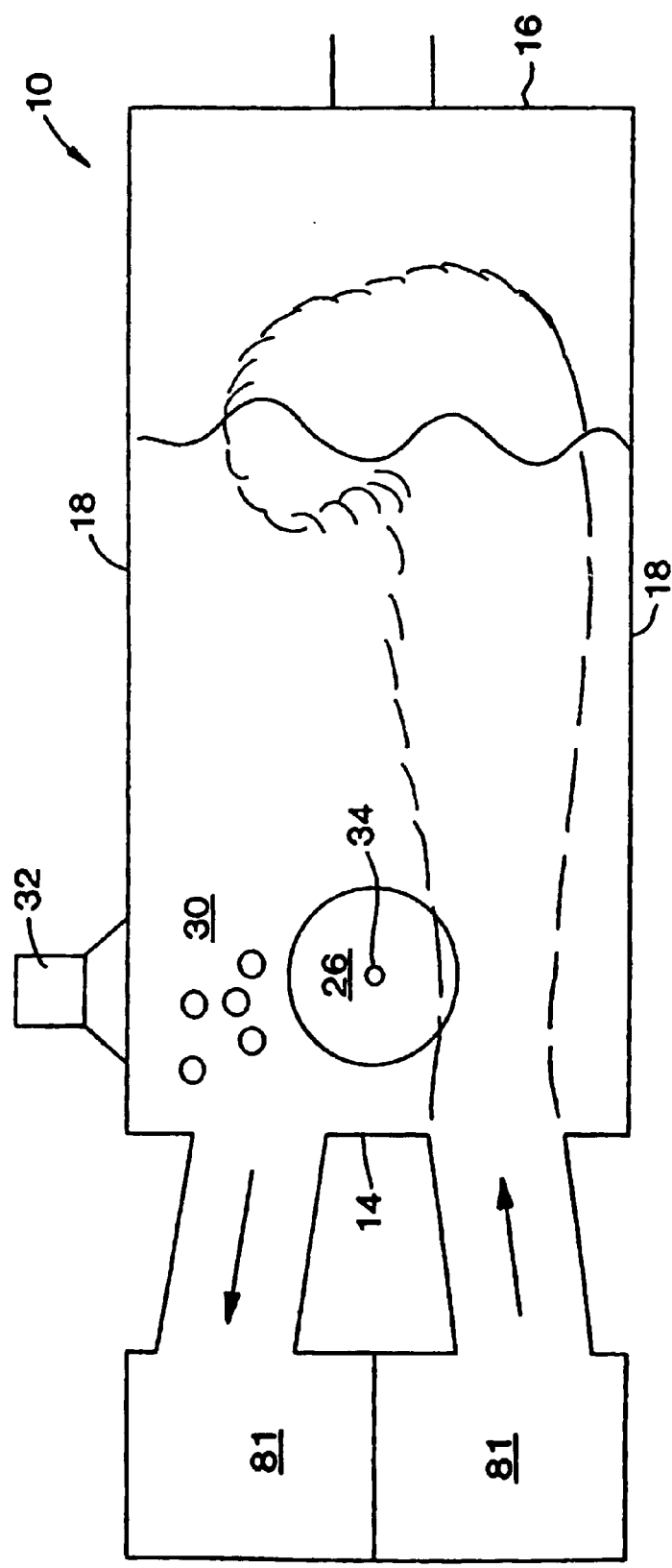
FIG. 2B is a cross-sectional plan view of an end-fired regenerative embodiment of the glass melting furnace of FIG. 1 along line 2—2.

In the end-fired regenerative furnace of FIG. 2B with regenerators 81 the preferred embodiment of the present invention utilizes at least one crown mounted burners 34 positioned over the raw batch materials entering the furnace to improve the rate of melting and improvement in quality to recover or boost production capacity or reduce electric boost capacity. In all end-fired regenerative furnace applications of this invention the combustion air and conventional fuel requirements will be reduced from the previous design and replaced with energy from the at least one crown mounted burners 34 positioned over the raw batch materials and impinging the batch materials in impingement area 26. Additional roof-mounted burners can be located down the glass tank provided there are crown mounted burners positioned over the unmelted batch materials. The energy delivered from the crown mounted burners replaces energy reduced from the firing port, the removed conventional electric or oxy-boost.

Figure 2C:
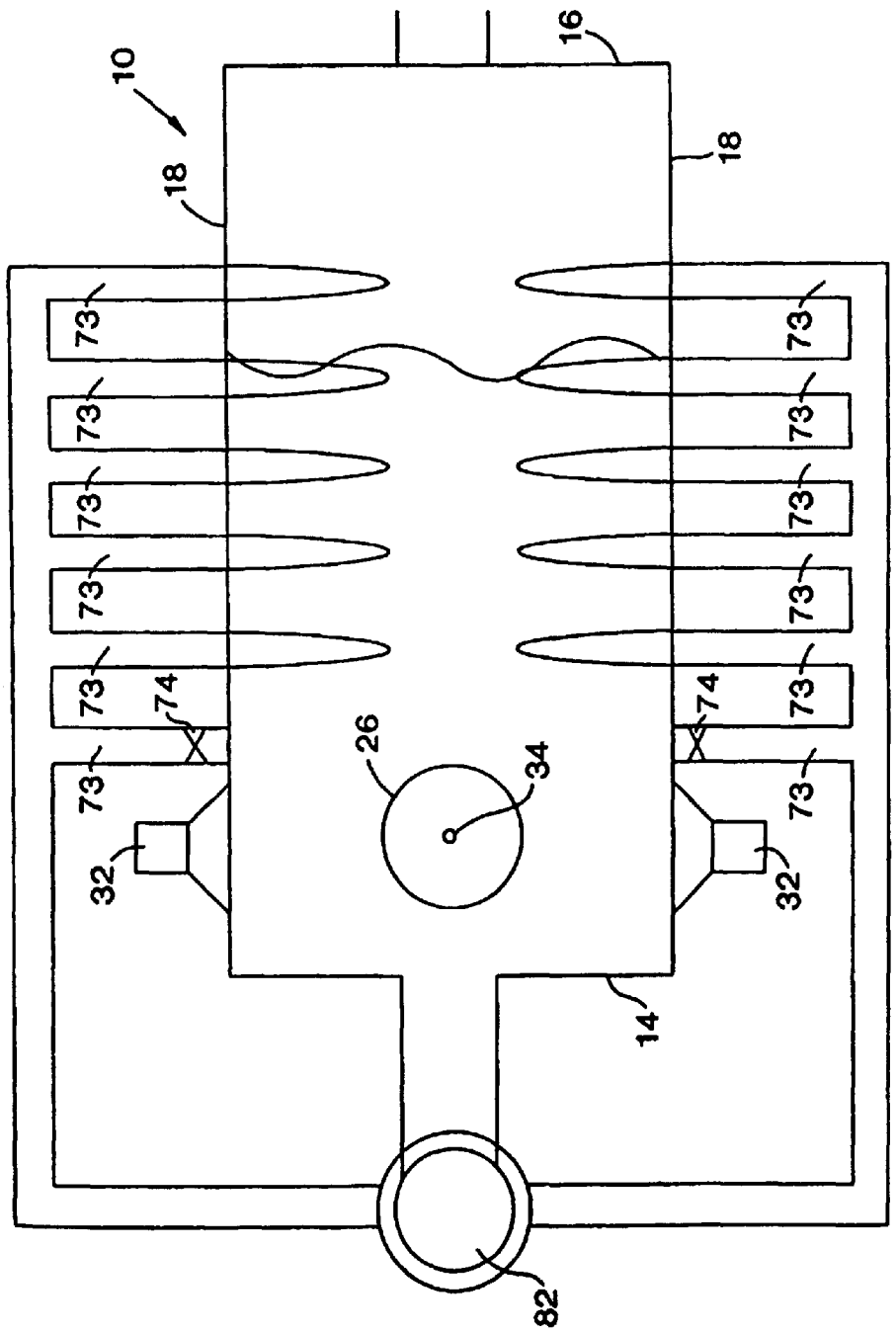
FIG. 2C is a cross-sectional plan view of a cross-fired recuperative embodiment of the glass melting furnace of FIG. 1 along line 2—2.

In the cross-fired recuperative furnace of FIG. 2C with recuperator 82 the preferred embodiment of the present invention utilizes at least one roof mounted burner 34 positioned over the raw batch materials entering the furnace to improve the rate of melting and improvement in quality to recover or boost production capacity or reduce electric boost capacity. In all cross-fired recuperative furnace applications of this invention at least one pair of the opposing burners 73 will be fully or partially blocked or isolated using a block 74. This will typically be the first zone of burners and perhaps the second zone dependent on the amount of boost required. Additional roof-mounted burners can be located down the glass tank provided there are crown mounted burners positioned over the unmelted batch materials. The energy delivered from the crown mounted burners replaces energy removed from the previously firing ports, the removed conventional electric or oxy-boost.

Figure 2D:
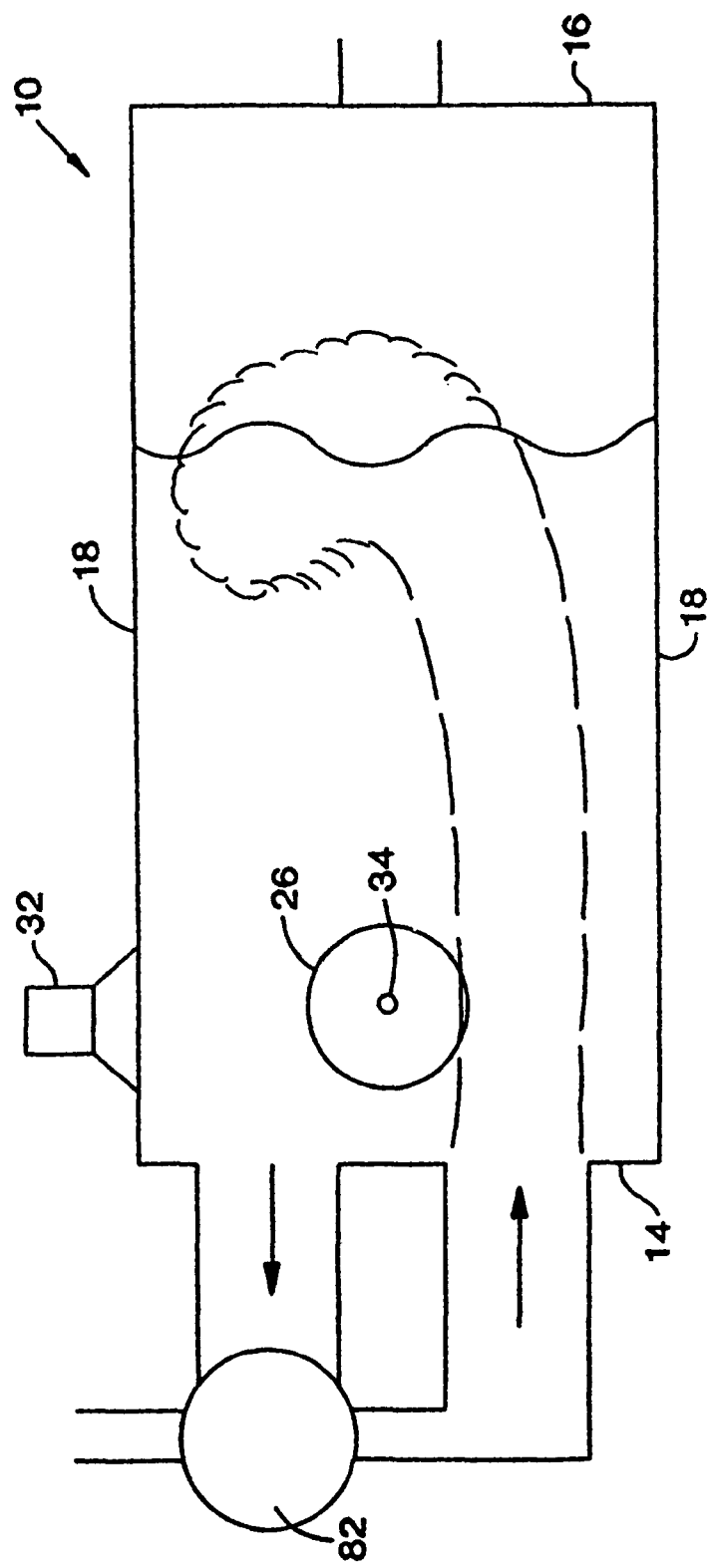
FIG. 2D is a cross-sectional plan view of an end-fired recuperative embodiment of the glass melting furnace of FIG. 1 along lines 2—2.

In the end-fired recuperative furnace of FIG. 2D with recuperator 82 the preferred embodiment of the present invention utilizes at least one crown mounted burner 34 positioned over the raw batch materials entering the furnace to improve the rate of melting and improvement in quality to recover or boost production capacity or reduce electric boost capacity. In all end-fired recuperative furnace applications of this invention the combustion air and conventional fuel requirements will be reduced from the previous design and replaced with energy from the at least one crown mounted burner 34 positioned over the raw batch materials. Additional roof-mounted burners can be located down the glass tank provided there are crown mounted burners positioned over the unmelted batch materials. The energy delivered from the crown mounted burners replaces energy reduced from the firing port, the removed conventional electric or oxy-boost.

Figure 2E:
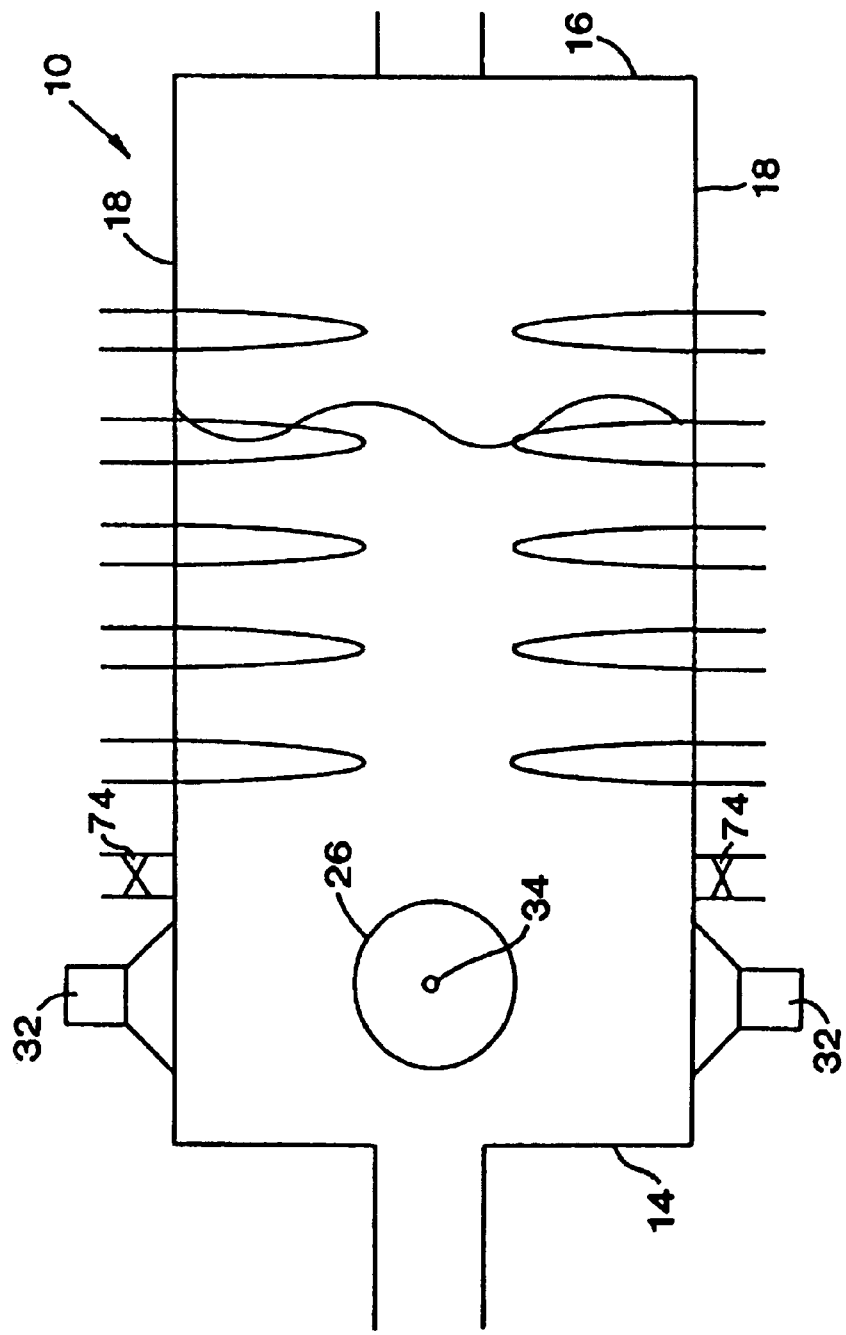
FIG. 2E is a cross-sectional plan view of a unit melter embodiment of the glass melting furnace of FIG. 1 along lines 2—2.

In the direct-fired furnace of FIG. 2E, the preferred embodiment of the present invention utilizes at least one crown mounted burners positioned over the raw batch materials entering the furnace to improve the rate of melting and improvement in quality to recover or boost production capacity or reduce electric boost capacity. In all direct fired furnace applications of this invention the combustion air and conventional fuel requirements will be reduced from the previous design and replaced with energy from the at least one crown mounted burners positioned over the raw batch materials. In multi-air-fuel-burner 73 applications at least one burner 74 will be isolated. Additional roof-mounted burners can be located down the glass tank provided there are crown mounted burners positioned over the unmelted batch materials. The energy delivered from the crown mounted burners replaces energy reduced from the firing port, the removed conventional electric or oxy-boost.

In an electric hot top furnace the preferred embodiment of the present invention utilizes at least one crown mounted burners positioned over the raw batch materials entering the furnace to improve the rate of melting and improvement in quality to recover or boost production capacity or reduce electric boost capacity. Additional roof-mounted burners can be located down the glass tank provided there are crown mounted burners positioned over the unmelted batch materials. The energy delivered from the crown mounted burners replaces energy reduced from the firing port, the removed conventional electric or oxy-boost.

In all cases nitrogen oxides and sulfur dioxide can be reduced by the careful selection of stoichiometric ratio of the different roof-mounted burners and remaining air fuel burners. Referring to FIG. 2A as an example in the cross-fired furnace application, the burners 34 mounted in the AL or AR positions are operated with excess stoichiometric oxygen to create a fuel lean (oxidizing) zone in the furnace. By operating either burner 34 at position BC and or burners at the second port 71 with less than stoichiometric oxygen or air creates a fuel rich (reducing) zone in the furnace. The remaining ports are operated with excess stoichiometric oxygen to create a fuel lean (oxidizing) zone in the furnace. This rich-lean-rich configuration effectively stages the combustion zones of the furnace to optimize heat transfer and minimize nitrogen oxide formation by creating a carbon monoxide screen.

The at least one roof mounted oxygen-fuel burner 34 may be either placed in a new air-fuel glass melter furnace 10 or retrofitted into an existing air-fuel glass melter furnace to increase the glass quality relative to an air-fuel only fired furnace. It will be appreciated that the present invention facilitates a substantial pull rate increase, reduction in glass melting furnace 10 wall temperature and improved glass quality as compared to the same air-fuel furnace that is not retrofitted with at least one roof mounted oxygen-fuel burner as described herein. Furthermore, as will be readily appreciated by one skilled in the art, the use of at least one oxygen-fuel burner as opposed to an all air-fuel system can appreciably reduce $NO_x$ emissions, dependent upon the stoichiometry of the oxy-fuel flames and the air-fuel flames.

EXAMPLE 1
Retrofit with Roof Mounted Oxy-fuel Burners

One demonstration of this invention was the oxygen boosting, 100% oxygen conversion, re-conversion to oxygen boost and finally conventional air fuel firing of an existing hot 3-port cross-fired regenerative furnace. The furnace was initially firing all air fuel. Port #1 firing was replaced with at least one roof mounted oxygen fuel burner. The furnace fired conventionally air fuel regenerative on the remaining two ports. In the second phase, Port #2 firing was then replaced with at least one roof mounted oxy-fuel burner and the furnace fired conventionally air fuel regenerative on the third port. In the third phase, Port #3 firing was replaced with energy in the already installed roof-mounted oxy-fuel burners. The furnace capacity was increased from 55 to 85 tons per day with reduced energy input from 23.5 mm BTU/hr to 18 mm BTU/hr. The furnace was re-converted to air fuel firing in incremental stages. This example demonstrates the ability to selectively boost an existing air fuel furnace as well as to provide total heat input for a glass furnace from roof-mounted oxy-fuel burners. The process does not require water-cooled burners.

EXAMPLE 2
Burner and Burner Block With Integral Oxygen Staging.

Figure 6:
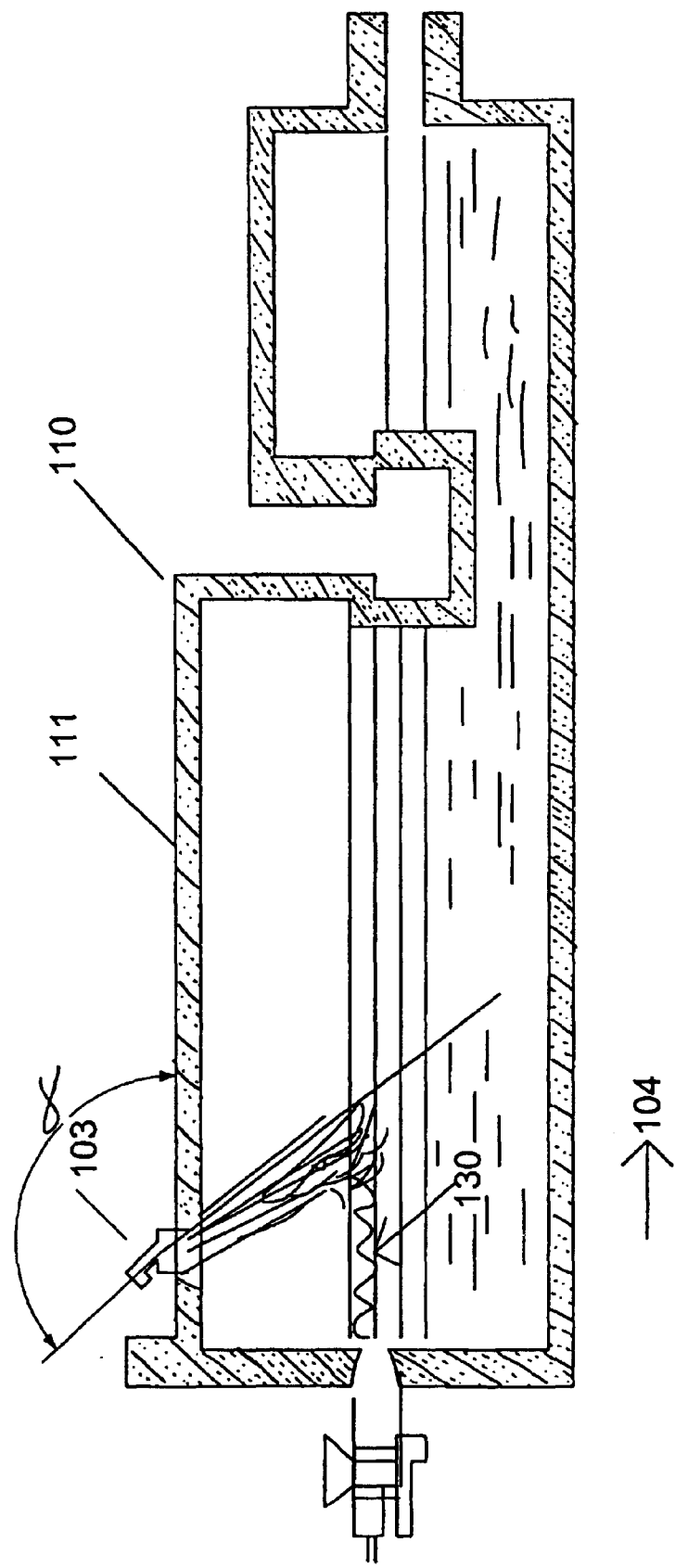
FIG. 6 is a cross sectional elevation view of a glass melting furnace having an integrally staged combustion, roof mounted oxy-fuel burner.

An oxy-fuel burner provided with integral staging of oxygen, by means of the burner configuration or the burner in combination with the burner block, has been shown to provide increased heat transfer and reduced NOx. According to the present invention, at least one of this type of integrally staged burner 103 is provided in the roof 111 of a glass melting furnace 110. The burner 103 is ideally positioned over the raw batch materials 130 and is preferably angled such that the angle alpha ($\alpha$ in FIG. 6) equals about 91° to about 135° in the direction of the glass flow 104 in the furnace.

EXAMPLE 3
A burner and Burner Block with External Oxygen Staging

Figure 7:
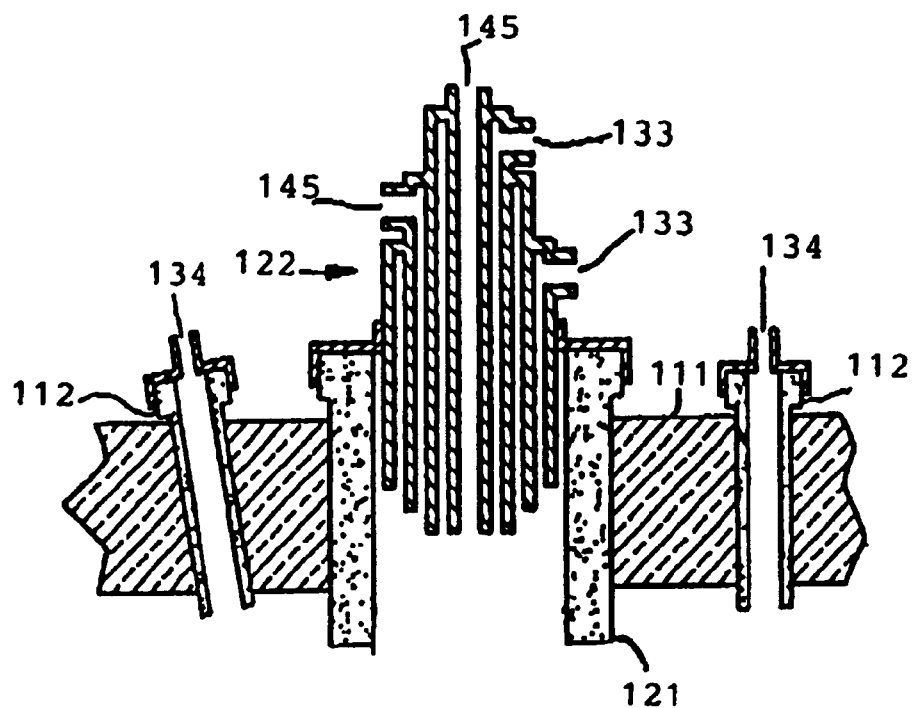
FIG. 7 is a cross sectional elevation view of a roof mounted oxy-fuel burner with associated external combustion staging means.

Referring to FIG. 7, it has been shown that a burner 122 with burner block 121 mounted in the roof of a glass melting furnace 111 with 2–8 oxygen injectors 112 external to the burner 122 and block 121 can produce higher heat transfer than a non-staged burner. The burner 122 is preferably angled from about 91° -to about 135° relative to the surface of the glass and in the direction of the glass flow in the furnace. According to this example, 0% to about 90% of the stoichiometric combustion oxygen is injected through the primary oxygen burner 133, and the remaining 100% to about 10% secondary combustion oxygen 134 is injected through the oxygen injectors 112, which are angled from about 0° to about 90° relative to the surface of the glass. As it can be appreciated by one skilled in the art, the number, angle and amount of staging ports is designed specifically for each furnace, in order to delay the combustion of the fuel 145 until it impinges on or near the surface of the raw glass batch materials.

EXAMPLE 4
Inter-burner Staging Between at Least Two Roof Mounted Burners

Figure 8:
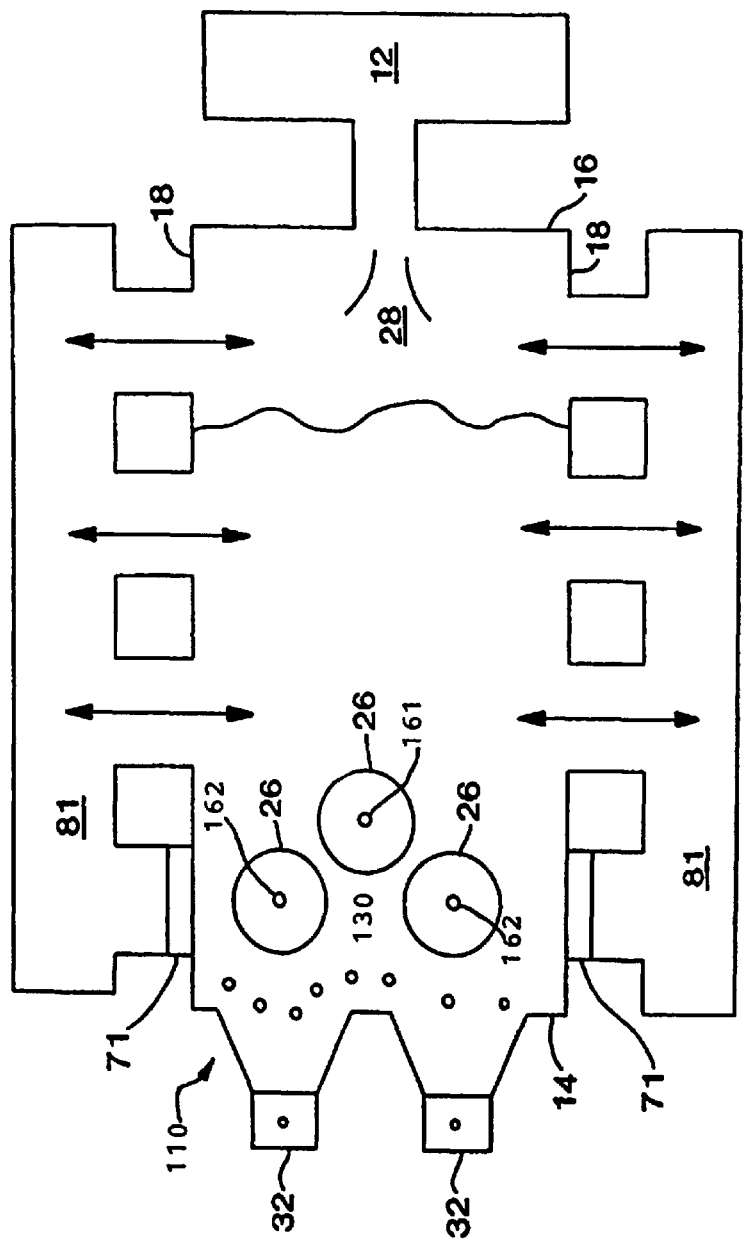
FIG. 8 is a schematic, plan view of a glass melting furnace having a roof mounted grouping of oxy-fuel burners operating at different stoichiometric ratios to achieve inter-burner staging.

The staging of combustion utilizing oxy-fuel burners can be accomplished according to the invention by inter-burner staging, between at least two roof mounted burners. One of the burners is operated at sub-stoichiometric levels, that is, in a fuel-rich mode, and the second or additional burner(s) is run with the balance of the oxygen required for complete combustion, that is, in a fuel-lean mode. Experimentation was conducted on the boosting of a conventional air fuel regenerative glass furnace 110, where two of the rear burners 162 were operated in a fuel lean mode, while the upstream, roof mounted oxy-fuel burner 161 was operated in a fuel rich mode. (FIG. 8). This mode of operation produced an oxy-fuel lean zone, adjacent to an oxy-fuel rich zone, followed by an air-fuel lean zone. The result of operating the glass furnace according to this method was to increase furnace capacity while reducing the emissions of oxides of nitrogen on a per ton basis. This method of inter-burner staging can also be applied in conjunction with the two previously detailed staged combustion embodiments.

Figure 9:
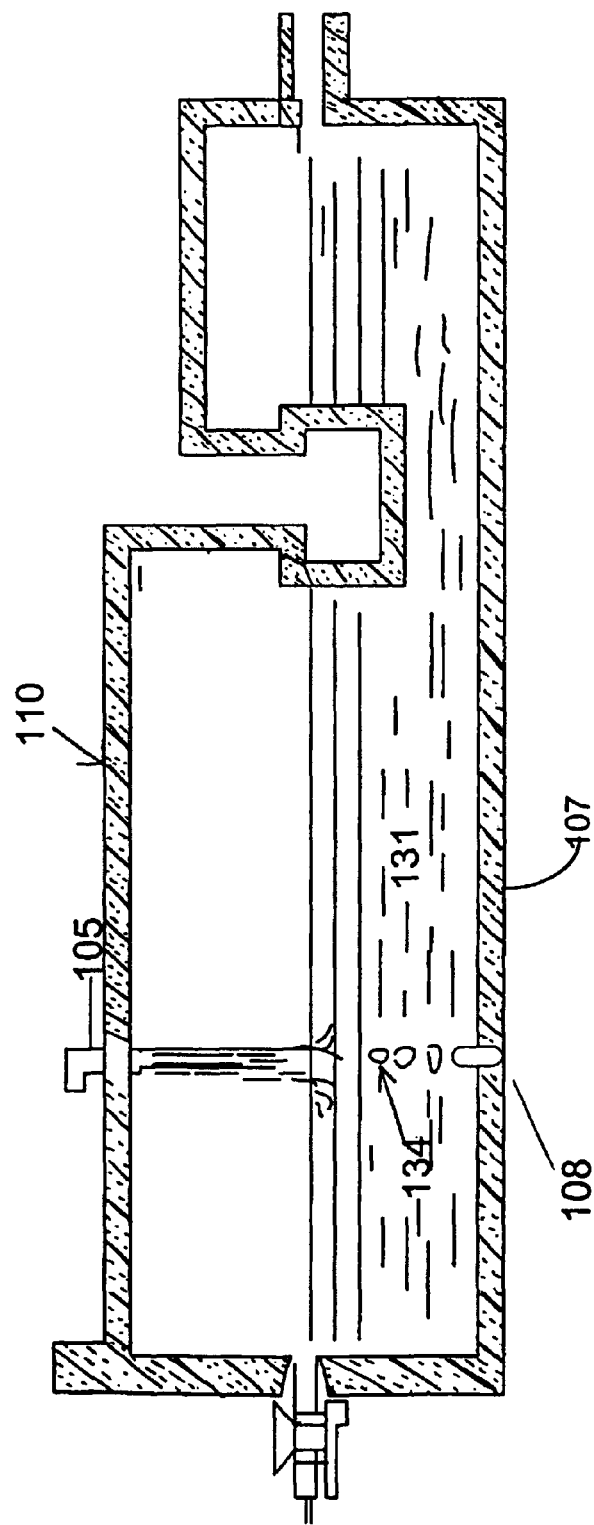
FIG. 9 is a cross sectional elevation view of a glass melting furnace having a roof mounted oxy-fuel burner and an associated oxygen bubbler for providing staged oxygen to the surface of the glass batch, through the melt.

EXAMPLE 5
Staging Combustion in a Glass Melting Furnace With Oxygen Bubblers One method of staging combustion according to the invention involves the use of oxygen bubblers in conjunction with at least one roof mounted burner (FIG. 9). Oxygen bubbling has been used for several glass manufacturing applications, such as to mechanically promote the convection currents within the molten glass. Oxygen is soluble in glass, and under normal operating conditions only a small amount (less than 5% of stoichiometric) of oxygen is injected into the glass. By positioning at least one roof mounted oxy-fuel burner 105 above a single oxygen bubbler 108, or a row or bundle of bubblers, it is possible to operate the roof mounted oxy-fuel burner(s) 105 under stoichiometric or sub-stoichiometric conditions, and supply the remainder of combustion oxygen 134 via bubblers 108 located in the floor 107 of the glass melter 110. This enhances the availability of oxygen at the glass 131 surface for secondary combustion of fuel or partially oxidized combustion products or reactive intermediates.

EXAMPLE 6
Oxy-Oil Burners

Conventional oil and oxygen oil burners for glass melting furnaces rely on the combustion of oil drops which have been atomized by either twin fluid atomizers (using steam or compressed gas) or mechanical atomizers (using either pressure or rotational energy). The flame shape is governed by the thrust of the spray and the size of the droplets. Conventional oxy-oil burners would release a high proportion of the heat in the near roof position.

Figure 10:
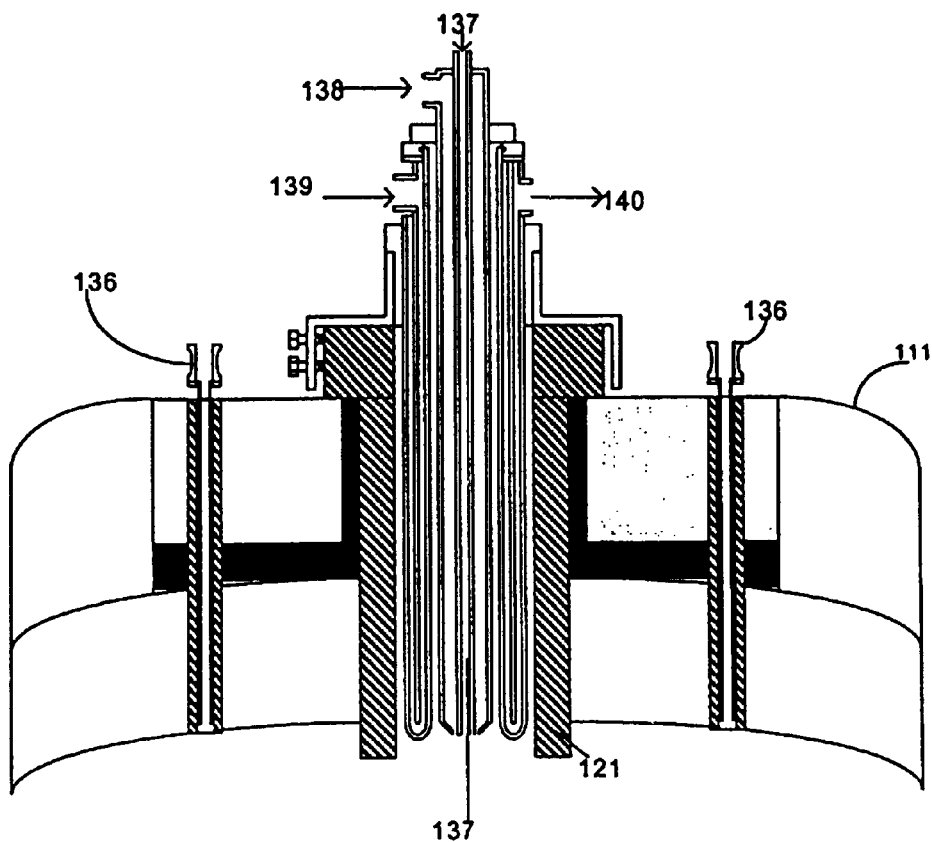
FIG. 10 is a cross-sectional elevation view of a roof-mounted oxy-oil burner with staged oxygen injectors according to the present invention.

As shown in FIG. 10, in this oxy-oil burner design, the majority of the combustion oxygen (greater than about 60%) is injected by at least 2 nozzles 136, or a plurality of nozzles up to a concentric ring set apart from, yet substantially surrounding the oil stream 137, to a point beyond the initial non visible combustion zone of the oil spray. The centerline of these nozzles is preferably angled about 45° to about 101° from the horizontal. This staging of the oxygen produces reactive intermediate species, such as described hereinabove, and delays complete combustion until it impinges on or near the raw batch materials. The remaining oxygen can be injected immediately adjacent and concentric to the oil stream 137, such as via the atomizing medium 138, via an additional concentric oxygen tube (not shown), or by tertiary injection in the furnace such as by an oxygen lance (not shown), to achieve complete combustion. This oxy-oil, staged, roof mounted burner minimizes heat release to the roof while maximizing heat transfer to the raw batch, due to the additional convective heat transfer on the surface. The burner may be cooled by a water jacket having an inlet 139 and an outlet 140.

An oil atomizer commonly used in the glass industry for conventional melting has been shown, by measurements made of the oil droplet particle size from this atomizer using Laser Doppler Annemometry, to produce a mean particle diameter of about 50 microns (50×10E–06 m) when atomized with compressed air.

We have found that in this and in other series of burners, the combustion of the oil spray is delayed until the oil meets the oxygen stream. A visible "no flame" can be witnessed at up to 18 inches from the atomizer tip. During this non-visible combustion phase in the hot glass melting furnace, the oil particle size is reduced due to endothermic evaporation. When utilized in a roof mounted burner, this endothermic reaction absorbs radiative heat energy from the surrounding environment, and advantageously reduces the net radiative heat transfer to the furnace roof.

The present invention includes the use of an atomizer that produces a significantly higher particle size, of greater than about 100 microns (100×10E–06 m). Less energy is required to produce this larger particle, and as a result, the thrust of the flame is reduced. The partially atomized large oil droplets free-fall from the roof-mounted burner, and at least partially evaporate in the endothermic, non visible combustion zone adjacent to the roof.

The maximum velocity of combustion reactants and products at the surface of the raw batch, however, should be less than 30 m/s to avoid air borne movement of raw batch materials.

Because a gas (such as oxygen) free jet expands about 11°, an oxygen outlet positioned close to a fuel outlet will cause oxygen to impinge on the fuel jet close to the outlet point. It is therefore preferred that staging of oxygen, and hence combustion, be accomplished by angling the oxygen outlets from about 45° convergent to the axis of the fuel stream to about 11° divergent from the axis of the fuel stream. This can be accomplished with externally staged burners, as well as with integrally staged burners where the oxygen outlets are provided in the burner block.

It is possible to further reduce the radiative losses from oxy-oil flames by altering the mechanisms that can lead to extremely radiative carbonaceous species in the flame. Two common processes leading to the formation of these species are liquid phase cracking and reformation of the less volatile components in the oil droplets and gaseous phase condensation reactions leading to soot formation. The former mechanism is exacerbated by large droplet sizes and the presence of aromatic compounds e.g. asphaltenes. The second mechanism is promoted in high temperatures and fuel rich regions where partially saturated gaseous phase reactants, e.g. acetylene, can react via a multitude of reaction paths to eventually form aromatic networks and eventually solid soot.

In one embodiment, the present invention preferably utilizes a high degree of atomization to produce small oil droplets, on the order of about 5 to about 50 microns, preferably about 10 to about 50 microns, so that the time spent in the liquid phase is short. Thus, liquid phase cracking is minimized and any resultant solid carbonaceous residue is finely divided and will thus be oxidized more readily by its increased surface area. Rapid mixing with an atomizing medium in the initial burner region, such as by inducing a relative velocity difference between the fuel atomizing and oxidant streams to increase the rate of shear in the gaseous phase, rapidly dilutes the fuel rich regions surrounding each oil droplet, thus creating a more substantially homogeneous mixture overall of vaporized fuel droplets, oxidant, atomizing medium and partial combustion products. Reactions of the fuel vapor with an oxidizing atomizing medium creates a partially precombusted mixture which is less prone to sooting. The amount of atomizing medium introduced in the initial region of the flame is very much dependent on the sooting nature of the fuel itself, which is a strong function of its chemical make up.

It is known that as a broad rule the degree of sooting that occurs is related to the C:H ratio of the oil, with a much reduced tendency to soot at greater H concentrations. However the trend becomes extremely erratic as the aromaticity of the fuel increases e.g. napthas are extremely prone to sooting. Thus the atomizing medium itself can be advantageously chosen to reduce the sooting tendency via alteration of the C:H ratio. Atomizing mediums useful in countering the sooting tendency include air, oxygen, steam, natural gas and hydrogen or a mixture thereof. The first two have a purely oxidizing effect, the last two have the effect of altering the C:H ratio in the fuel vapor/atomization medium mixture in the near burner region so that sooting conditions are avoided. Steam has a combined effect, and coupled with radiative heating from the main flame and/or furnace, causes gasification reactions to occur, yielding CO and $H_2$ for further reaction.

Following the initial near burner region, the original liquid fuel stream becomes essentially a gaseous fuel stream, and interacts with surrounding secondary oxygen streams in the same manner as experienced with use of the staged gas burners discussed above.

EXAMPLE 7

Fuel Staged Oxy Fuel Burner

Figure 11:
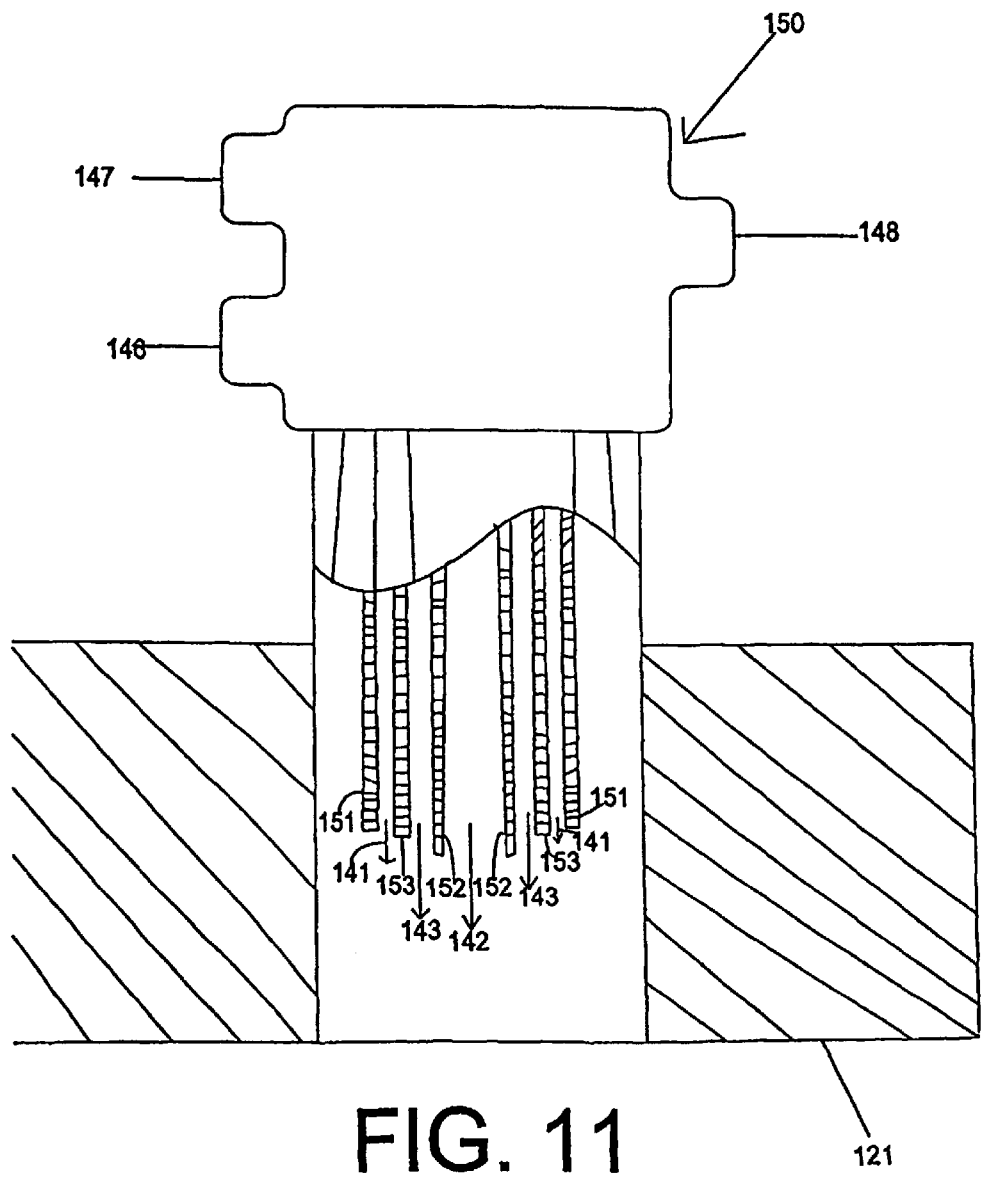
FIG. 11 is a schematic, cutaway view of a fuel staged oxy-fuel burner.

An oxy-fuel burner 150 shown schematically in FIG. 11 was designed for use in roof mounted glass melting furnace applications, using fuel staged principles, from one outer oxidant (oxygen) injector and two inner fuel injectors; one central fuel injector being adapted for high velocity injection and one annular fuel injector being adapted for low velocity injection. The injectors preferably comprise at least three concentric tubes. Burner flame length and oxidant-fuel mixing is controlled by a central high pressure fuel jet 142, which is supplied through tube walls 152 from the first fuel feed 147, utilizing about 10–90% of the fuel stream. This high velocity, high momentum flow governs the flame shape and the mixing, rather than the lower momentum fuel gas shroud 143. This gas flow is also higher than that of the oxygen flow, in order to control the mixing. The remaining fuel 143 (about 90–10%) is supplied from the second fuel feed 148 concentrically through at least one annular fuel injector formed by tube walls 152 and tube walls 153, with the combustion oxygen 141 being supplied from the oxygen feed 146 via an outer annular injector formed by tube walls 151 and tube walls 153. Sizing of the central high pressure injector governs the rate of mixing due to the high momentum of the jet. The central jet is staged due to the shrouding of the secondary gas streams. This arrangement provides a means of propelling the fuel gas, such as natural gas, and allowing the fuel gas to interact with raw batch and oxygen in a staged manner near the batch surface in a glass furnace application. Optionally, the central high velocity jet may have a lower mass than the low velocity fuel jet, as long as the momentum of the central jet is higher.

In one embodiment, the high velocity central jet may comprise a liquid fuel supplied by a liquid fuel burner, such as an oil burner, rather than a gaseous fuel, and the lower velocity fuel shroud may comprise a gaseous fuel.

The patents and documents described herein are hereby incorporated by reference.

Although the invention has been described in detail with reference to certain specific embodiments, those skilled in the art will recognize that there are other embodiments within the spirit and scope of the claims. It should therefore be appreciated that the present invention is not limited to the specific embodiments described above, but includes variations, modifications and equivalent embodiments defined by the following claims.

What is claimed is:

1. A method of melting glass forming material in a glass melting furnace, said furnace having a back wall, breastwalls above sidewalls, and a downstream front wall connected to a roof, wherein at least one batch charger for charging glass forming batch material is contained in at least one of the back wall and the sidewall, comprising:
   providing at least one oxy-fuel burner in the roof of said furnace over said batch material, wherein said at least one oxy-fuel burner is adapted for staged combustion;
   providing a flow of fuel to said at least one oxy-fuel burner;
   providing a flow of gaseous oxidant in association with said at least one oxy-fuel burner;
   injecting the fuel and the oxidant into the furnace; and,
   combusting said fuel from at least said one oxy-fuel burner such that at least a portion of combustion is effected in the vicinity of said glass forming material to enhance convective and radiative transfer of heat to said glass forming material without substantially disturbing said glass forming material.

2. The method of claim 1 wherein the mixing of said fuel and said oxidant is delayed to localize combustion proximate to or at the surface of said glass forming material.

3. The method of claim 1 wherein the injected fuel jet and the injected oxidant jet are separated, and are optionally angled with respect to the other, by an amount sufficient to cause the respective flows to converge proximate to or at the surface of the glass forming material.

4. The method of claim 3 wherein the fuel jet comprises one of a substantially fuel only jet and a fuel rich fuel-oxidant mixture, and wherein the oxidant jet comprises one of a substantially oxidant only jet and a fuel lean fuel-oxidant mixture.

5. The method of claim 4 wherein the fuel jet and oxidant jet are separated and angled with respect to each other from 0° to about 90°.

6. The method of claim 1 wherein oxidant is bubbled from beneath the glass forming material surface.

7. The method of claim 1 including fully combusting reactive intermediate species proximate to or at the glass forming material surface.

8. The method of claim 1 wherein the oxy-fuel burner is contained in a burner block, further wherein said providing a flow of gaseous oxidant comprises providing integral staging of said oxidant via injection from the same oxy-fuel burner block.

9. The method of claim 1 wherein the oxy-fuel burner is contained in a burner block, further wherein said providing a flow of gaseous oxidant comprises providing external staging of said oxidant via injection separate from the oxy-fuel burner block.

10. The method of claim 9 further comprising providing at least one secondary oxidant injector in the roof of said furnace to provide additional oxidant for completing combustion proximate to or at the surface of said glass forming material.

11. The method of claim 9 including injecting from 0 to 90% of stoichiometric oxidant through the oxy-fuel burner block and injecting from 100% to about 10% stoichiometric oxidant via at least one secondary oxidant injector separate from the oxy-fuel burner block.

12. The method of claim 1 wherein the glass forming material enters the furnace through at least one charger, including providing the at least one oxy-fuel burner in the roof of the furnace proximate to the at least one charger above the glass forming material.

13. The method of claim 1 wherein the burner is mounted substantially perpendicular to the surface of the glass forming material.

14. The method of claim 13 wherein the burner is mounted up to 45 degrees away from the perpendicular and toward the downstream front wall of the furnace.

15. The method of claim 13 wherein the burner is mounted not more than 10 degrees from the perpendicular and toward the downstream front wall of the furnace.

16. The method of claim 1 wherein the oxidant is selected from the group consisting of oxygen-enriched air, non-pure oxygen and "industrially" pure oxygen.

17. The method of claim 1, including staging the flow of fuel from the oxy-fuel burner.

18. The method of claim 1 wherein the fuel is a gas selected from the group consisting of methane, natural gas, liquefied natural gas, propane, liquefied propane gas, butane, low BTU gases, town gas, producer gas and mixtures thereof.

19. The method of claim 1 wherein the fuel is a liquid selected from the group consisting of heavy fuel oil, medium fuel oil, light fuel oil, kerosene and diesel.

20. The method of claim 1 wherein at least one oxy-fuel burner is provided in the roof proximate the downstream front wall.

21. The method of claim 1 wherein the glass forming material comprises material selected from the group consisting of cullet, silica, feldspar, nepheline syenite, limestone, dolomite, soda ash, potash, borax, kaolin clay, alumina, arsenic, antimony, sulfates, sulfides, carbon, barium oxide, strontium oxide, zirconium oxide, lead oxide, color forming metal oxides, and mixtures thereof.

22. The method of claim 1 including providing all furnace burners as oxy-fuel burners.

23. The method of claim 1 including providing all furnace burners as roof mounted burners.

24. A method of melting glass forming material in a glass melting furnace, said furnace having a back wall, breastwalls above sidewalls, and a downstream front wall connected to a roof, wherein at least one batch charger for charging glass forming batch material is contained in at least one of the back wall and the sidewall, comprising:

providing at least one oxy-fuel burner in the roof of said furnace over said batch material, wherein said at least one oxy-fuel burner is adapted for staged combustion;

providing a flow of fuel to said at least one oxy-fuel burner;

providing a flow of gaseous oxidant in association with said at least one oxy-fuel burner;

injecting the fuel and the oxidant into the furnace; and, combusting said fuel from at least said one oxy-fuel burner such that at least a portion of combustion is effected in the vicinity of said glass forming material to enhance convective and radiative transfer of heat to said glass forming material without substantially disturbing said glass forming material;

including operating at least one said roof mounted oxy-fuel burner in a fuel rich mode and at least one said roof mounted oxy-fuel burner in a fuel lean mode.

25. A method of melting glass forming material in a glass melting furnace, said furnace having a back wall, breastwalls above sidewalls, and a downstream front wall connected to a roof, wherein at least one batch charger for charging glass forming batch material is contained in at least one of the back wall and the sidewall, comprising:

providing at least one oxy-fuel burner in the roof of said furnace over said batch material;

providing a flow of liquid fuel to said at least one oxy-fuel burner;

providing a flow of gaseous oxidant in association with said at least one oxy-fuel burner;

injecting the fuel and the gaseous oxidant into the furnace;

combusting said fuel and, controlling the velocity of the flow of fuel and oxidant to prevent disturbance and entrainment of said batch material while maintaining convective heat transfer to said batch material.

26. The method of claim 25 wherein the liquid fuel is selected from the group consisting of heavy fuel oil, medium fuel oil, light fuel oil, kerosene and diesel.

27. The method of claim 26 wherein the injected liquid fuel has a droplet size of greater than about 100 microns.

28. The method of claim 25 wherein the burner is mounted substantially perpendicular to the surface of the batch material.

29. The method of claim 25 wherein the burner is mounted up to 45 degrees away from the perpendicular and toward the downstream front wall of the furnace.

30. The method of claim 25 wherein the burner is mounted not more than 10 degrees from the perpendicular and toward the downstream front wall of the furnace.

31. The method of claim 25 including atomizing the liquid fuel to produce droplets in the range of about 5 microns to about 50 microns.

32. The method of claim 31 including rapidly mixing the droplets with an atomizing medium in the initial burner region to form a substantially homogeneous mixture.

33. The method of claim 31 including atomizing the liquid fuel with an oxidizing atomizing medium to produce a partially pre-combusted mixture.

34. The method of claim 31 including atomizing the liquid fuel with an atomizing medium selected from the group consisting of air, oxygen, steam, natural gas and hydrogen or mixtures thereof to reduce the C:H ratio in the fuel/atomizing medium mixture.

35. A method of melting glass forming material in a glass melting furnace, said furnace having a back wall, breastwalls above sidewalls, and a downstream front wall connected to a roof, wherein at least one batch charger for charging glass forming batch material is contained in at least one of the back wall and the sidewall, comprising:

providing at least one oxy-fuel burner in the roof of said furnace over said batch material, wherein said at least one oxy-fuel burner is adapted for staged combustion;

providing a flow of liquid fuel to said at least one oxy-fuel burner;

providing a flow of gaseous oxidant in association with said at least one oxy-fuel burner;

injecting the fuel and the gaseous oxidant into the furnace; and, combusting said fuel from at least said one oxy-fuel burner such that at least a portion of combustion is effected in the vicinity of said glass forming material to enhance convective and radiative transfer of heat to said glass forming material without substantially disturbing said glass forming material.

36. The method of claim 35 wherein the oxy-fuel burner is contained in a burner block, further wherein said injecting the gaseous oxidant comprises providing integral staging of said oxidant via injection from the same oxy-fuel burner block.

37. The method of claim 35 wherein the oxy-fuel burner is contained in a burner block, further wherein said injecting the gaseous oxidant comprises providing external staging of said oxidant via injection separate from the oxy-fuel burner block.

38. The method of claim 35 further comprising the step of mounting at least one oxygen injector in the roof of said furnace to provide additional oxygen to complete combustion at or near the surface of said batch material.

39. The method of claim 35 comprising injecting a majority of oxidant set apart from and substantially surrounding the liquid fuel flow to a point beyond the initial non visible combustion zone.

40. The method of claim 39 including angling the injected fuel and the injected oxidant about 45° to about 101° from the horizontal.

41. The method of claim 39 including injecting the remainder of the oxidant adjacent to and concentric to the injected fuel.

42. The method of claim 39 including injecting the remainder of the oxidant by tertiary injection into the furnace.

43. The method of claim 35 including staging the flow of the fuel from the oxy-fuel burner.

44. A method of melting glass forming material in a glass melting furnace, said furnace having a back wall, breastwalls above sidewalls, and a downstream end front wall connected to a roof, wherein at least one batch charger for charging glass forming batch material is contained in at least one of the back wall and the sidewall, comprising:

providing at least one oxy-fuel burner in the roof of said furnace over said batch material, wherein said at least one oxy-fuel burner is adapted for fuel staged combustion and contains at least one outer oxidant injector and two inner fuel injectors, the innermost fuel injector being adapted for high velocity fuel injection and the other fuel injector, disposed between the innermost fuel injector and the outer oxidant injector, being adapted for lower velocity fuel injection;

providing a flow of fuel to said at least one oxy-fuel burner, wherein the flow of fuel through the innermost fuel injector has a higher momentum than the flow of fuel through the other fuel injector;

providing a flow of gaseous oxidant to the outer oxidant injector, having a lower momentum than the flow of fuel through the innermost fuel injector;

combusting said fuel from at least said one oxy-fuel burner such that at least a portion of combustion is effected in the vicinity of said glass forming material to enhance convective and radiative transfer of heat to said glass forming material without substantially disturbing said glass forming material.

45. The method of claim 44 wherein about 10% to about 90% of the fuel flow is utilized by the innermost fuel injector.

46. The method of claim 44 wherein the mass of the fuel flow of the innermost fuel injector is lower than the mass of the fuel flow of the other fuel injector.

47. The method of claim 44 wherein the mass of the fuel flow of the innermost fuel injector is greater than the mass of the fuel flow of the other fuel injector.

48. The method of claim 44 wherein a liquid fuel is provided to the innermost fuel injector, and a gaseous fuel is provided to the other fuel injector.

49. The method of claim 48 wherein the liquid fuel is selected from the group consisting of heavy fuel oil, medium fuel oil, light fuel oil, kerosene and diesel; and the gaseous fuel is selected from the group consisting of methane, natural gas, liquefied natural gas, propane, liquefied propane gas, butane, low BTU gases, town gas, producer gas and mixtures thereof.

50. The method of claim 44 wherein the fuel is a gas selected from the group consisting of methane, natural gas, liquefied natural gas, propane, liquefied propane gas, butane, low BTU gases, town gas, producer gas and mixtures thereof.

51. The method of claim 44 wherein the oxidant is selected from the group consisting of oxygen-enriched air, non-pure oxygen and industrially pure oxygen.

52. A method of melting batch material in a glass furnace having regenerators, recuperators and/or electric boost, said furnace having sidewalls, a back wall, a front wall and a roof comprising:

providing at least one burner in the roof of said furnace over said batch material;

providing a flow of gaseous oxidant to said at least one burner;

providing a flow of gaseous fuel to said at least one burner;

generating a flame from at least said one burner said flame having a velocity sufficient to maximize transfer of heat from said flame to said batch material without substantially disturbing said batch material, and, providing additional oxygen to complete combustion at or near the surface of said batch material from at least one oxygen injector in the roof of said furnace.

* * * * *